US012515462B2

(12) United States Patent
Ito et al.

(10) Patent No.: US 12,515,462 B2
(45) Date of Patent: Jan. 6, 2026

(54) INK JET RECORDING APPARATUS

(71) Applicant: CANON KABUSHIKI KAISHA, Tokyo (JP)

(72) Inventors: Takehiro Ito, Tokyo (JP); Yosuke Obayashi, Chiba (JP); Kazumi Sato, Tokyo (JP); Masanobu Tanaka, Chiba (JP); Naoki Akiyama, Ibaraki (JP); Shinsuke Takahashi, Chiba (JP); Masayuki Tamaki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 18/602,252

(22) Filed: Mar. 12, 2024

(65) Prior Publication Data

US 2024/0316955 A1 Sep. 26, 2024

(30) Foreign Application Priority Data

Mar. 24, 2023 (JP) ................................ 2023-048257
Dec. 14, 2023 (JP) ................................ 2023-211539

(51) Int. Cl.
*B41J 11/00* (2006.01)
*B41J 13/03* (2006.01)
*B41J 13/08* (2006.01)

(52) U.S. Cl.
CPC ......... *B41J 11/00242* (2021.01); *B41J 13/03* (2013.01); *B41J 13/08* (2013.01)

(58) Field of Classification Search
CPC ...... B41J 11/00242; B41J 13/03; B41J 13/08; B41J 11/00212; B41J 11/00216
See application file for complete search history.

(56) References Cited

U.S. PATENT DOCUMENTS

2004/0189773 A1 9/2004 Masumi et al.
2013/0051831 A1* 2/2013 Shinagawa ........ G03G 15/2032 399/329
2017/0266987 A1 9/2017 Asada et al.
2019/0240995 A1 8/2019 Shiki et al.

FOREIGN PATENT DOCUMENTS

JP 2006053310 A 2/2006
JP 2020015291 A 1/2020

OTHER PUBLICATIONS

Extended European Search Report issued in European Appln. No. 24161980.8 mailed Jul. 18, 2024.

* cited by examiner

*Primary Examiner* — Bradley W Thies
(74) *Attorney, Agent, or Firm* — ROSSI, KIMMS & McDOWELL LLP

(57) ABSTRACT

An ink jet recording apparatus includes first and second belts stretched by a plurality of rollers, including first, second and third rollers, and forming a nip, a heater disposed inside the first belt. The first roller is disposed upstreammost among the plurality of rollers in a conveyance direction, the second roller is disposed downstream of an irradiation area of the first belt heated by the heater and the third roller is disposed between from the second roller to the first roller in a rotational direction of the first belt. A first temperature sensor detects a temperature of the irradiation area in an inner circumferential surface. A second temperature sensor detects a temperature of the first belt between from the second roller to the third roller in the rotational direction.

20 Claims, 26 Drawing Sheets

(a)

(b)

INK JET RECORDING APPARATUS

FIELD OF THE INVENTION AND RELATED ART

The present invention relates to an ink jet recording apparatus which fixes an image formed by ink onto a sheet.

Conventionally, an ink jet recording apparatus forming an image on a sheet by discharging ink toward the sheet is known. In the ink jet recording apparatus, a heating device is used to improve fixing performance of the ink by applying heat and pressure to the sheet on which the image is formed with the ink, thereby allowing the ink to penetrate the sheet. As an example of such a heating device, a thermal fixing type, which is provided with a fixing roller heated by a heating member having a heater and a pressing roller forming a fixing nip portion by being in pressure contact with the fixing roller and applies pressure and heat to the sheet while nips and conveys the sheet in the fixing nip portion, is known.

Conventionally, though in a case of an image forming apparatus of an electrophotographic type, temperature control of the heater based on a detection result of a thermistor which detects a temperature of the fixing roller is practiced. In addition, based on the detection result of the thermistor which detects a temperature of the heater, control to stop supplying electric power to the heater if the temperature of the heater exceeds a predetermined temperature is practiced (Japanese Patent Application Laid-Open No. 2006-53310).

In the recent ink jet recording apparatus, the heating device of a so-called long nip configuration, in which an endless fixing belt instead of the fixing roller is used and an endless pressing belt instead of the pressing roller is used, thereby efficiently applying the pressure and the heat to the sheet, is used. In these heating devices, the fixing belt is directly heated by a heater in order to raise the fixing belt to a high temperature as quickly as possible.

In a case in which the fixing belt is directly heated by the heater, for example, when the temperature of the fixing belt rises rapidly since some abnormality such as stopping of the fixing belt occurs, there is a possibility that the temperature of the fixing belt may become too high, and the fixing belt may be thermally deformed. This is because the temperature rise of the fixing belt is so rapid that performing the control to stop the power supply to the heater based on the detection result of the thermistor which detects the temperature of the heater is not early enough to suppress the temperature rise of the fixing belt in time. Therefore, an apparatus which can suppress a temperature rise of a fixing belt even in a case in which a temperature of the fixing belt rises rapidly has been desired, however, such a device has not yet been proposed.

The present invention is conceived in view of the above problem and an object thereof is to provide an ink jet recording apparatus which can suppress a temperature rise of a fixing belt even in a case in which a temperature of the fixing belt rises rapidly.

SUMMARY OF THE INVENTION

According to an aspect of the present invention, there is provided an ink jet recording apparatus comprising: an image forming portion configured to form an image on a sheet by discharging ink; an endless first belt stretched by a plurality of rollers; a second belt in contact with the first belt and configured to form a nip portion; a heater disposed inside the first belt and configured to heat the nip portion in a non-contact manner, wherein the first belt and the second belt nip and convey, and pressurize and heat the sheet which bears the image formed by the image forming portion; a first roller which is one of the plurality of rollers disposed upstreammost among the plurality of rollers in a conveyance direction of the sheet; a second roller which is another of the plurality of rollers disposed downstream of an irradiation area which is an area, of the first belt, heated by the heater in the conveyance direction of the sheet and configured to separate the sheet; a first temperature detecting member configured to detect a temperature of the irradiation area in an inner circumferential surface; a third roller which is another of the plurality of rollers disposed between from the second roller to the first roller in a rotational direction of the first belt; and a second temperature detecting member configured to detect a temperature of the first belt between from the second roller to the third roller in the rotational direction of the first belt.

Further features of the present invention will become apparent from the following description of exemplary embodiments with reference to the attached drawings.

Figure 3:
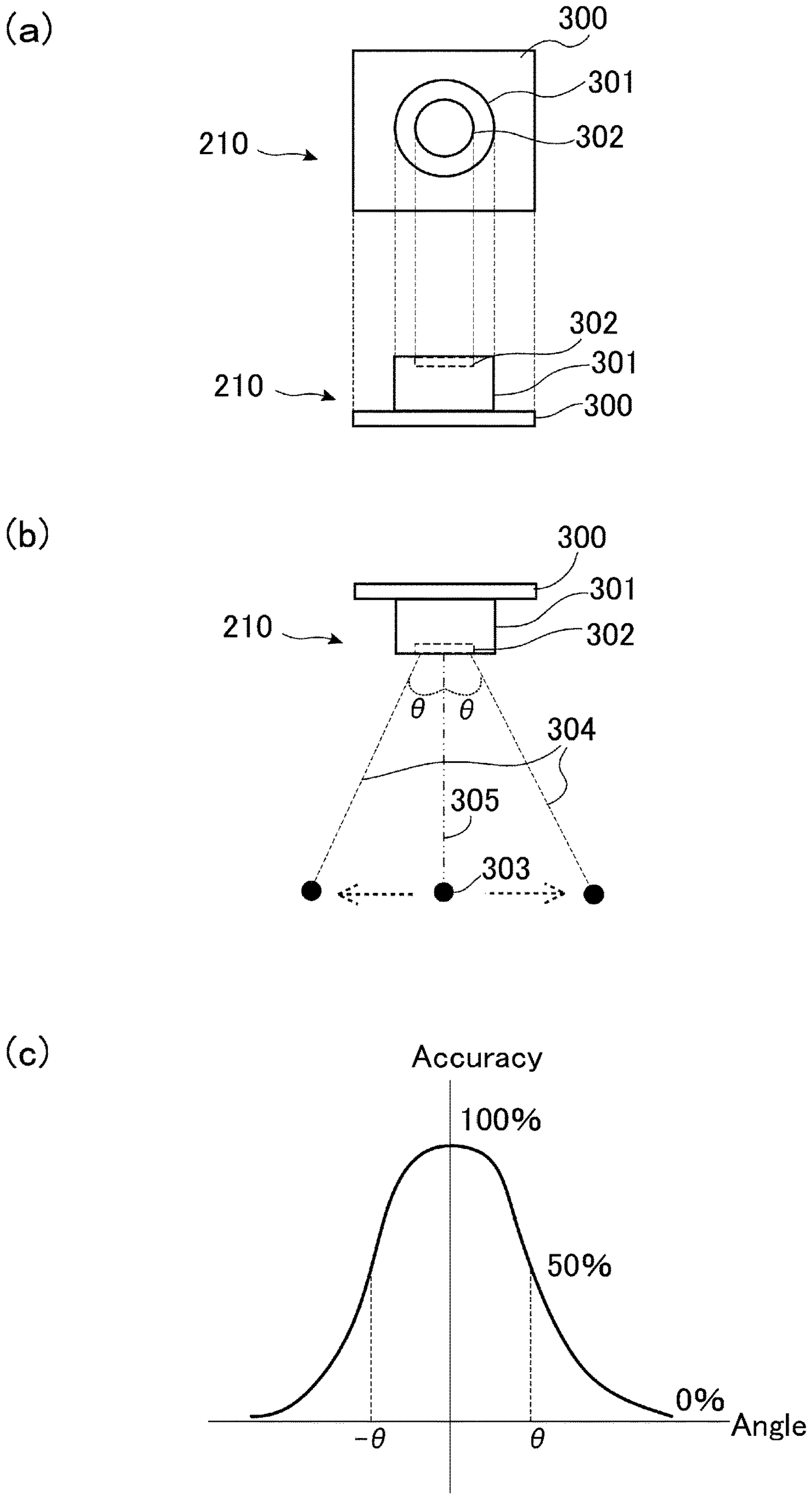

Part (a) of FIG. 3 is a view illustrating a structure of a temperature sensor for an upper heater, part (b) of FIG. 3 is a view illustrating a viewing angle of the temperature sensor for the upper heater, and part (c) of FIG. 3 is a view for describing the viewing angle.

Figure 4:
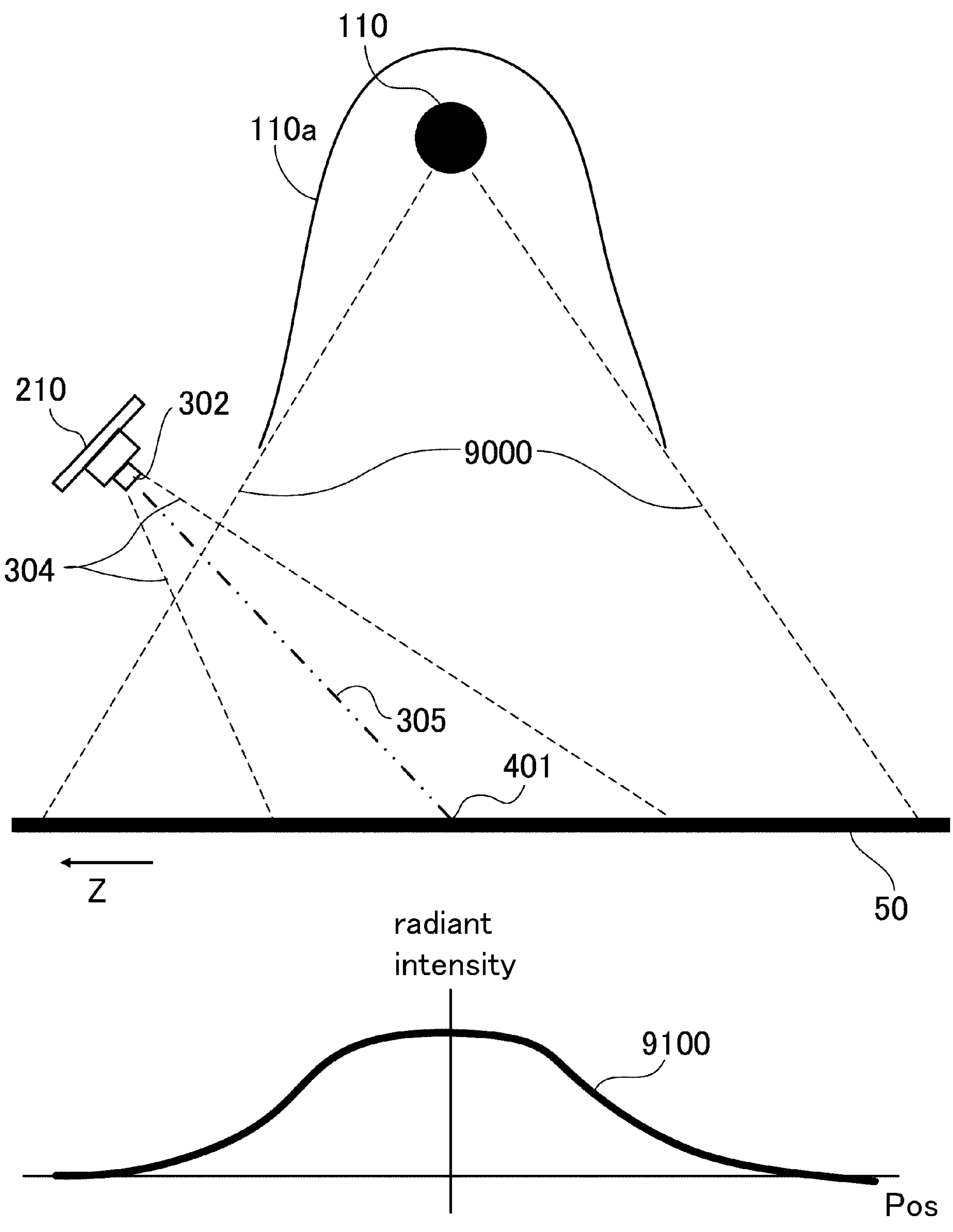

FIG. 4 is a schematic view illustrating an example in which the temperature sensor for the upper heater is disposed on a downstream side.

Figure 5:
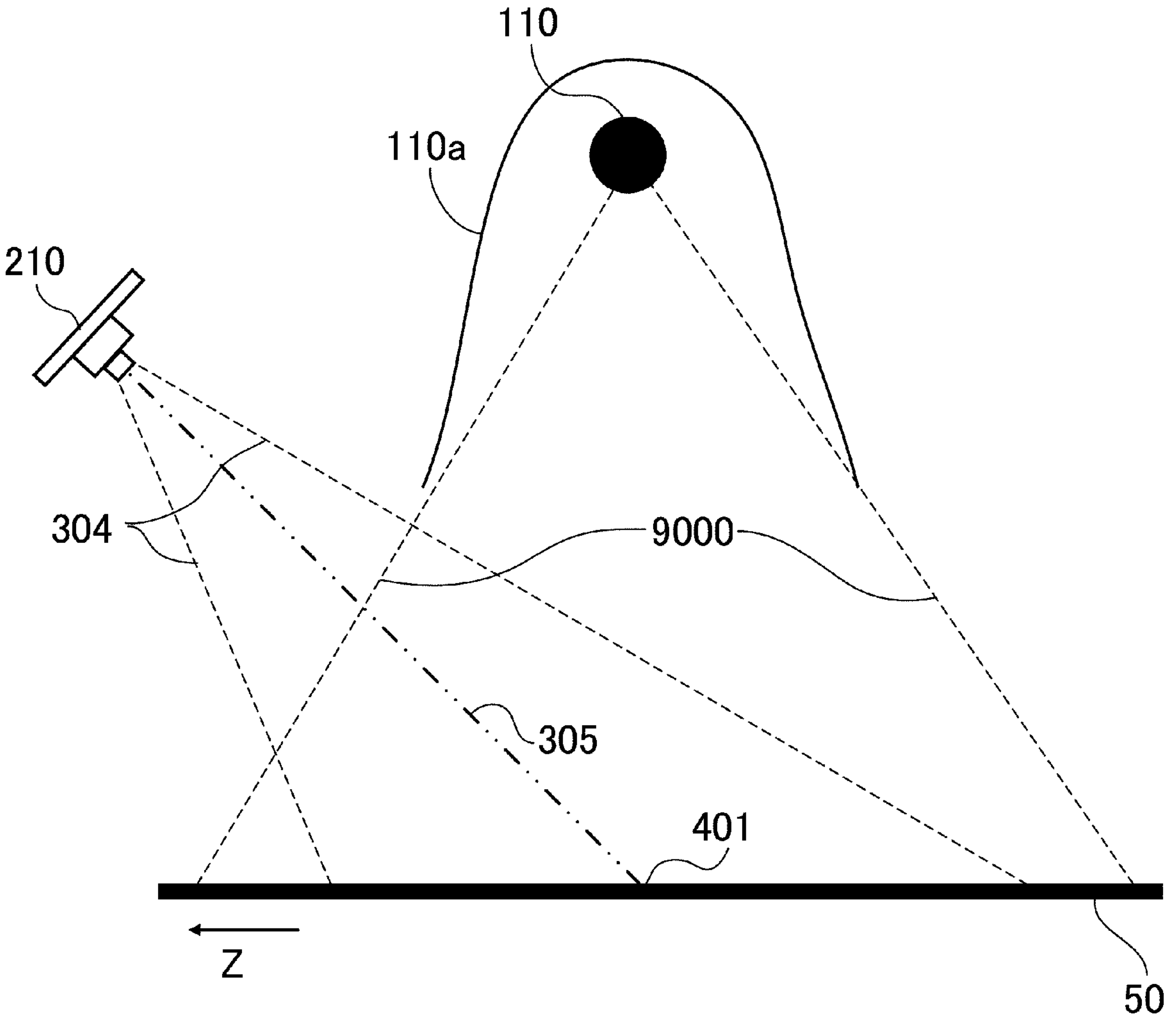

FIG. 5 is a schematic view illustrating an example in which the temperature sensor for the upper heater is disposed away from an upper belt.

Figure 6:
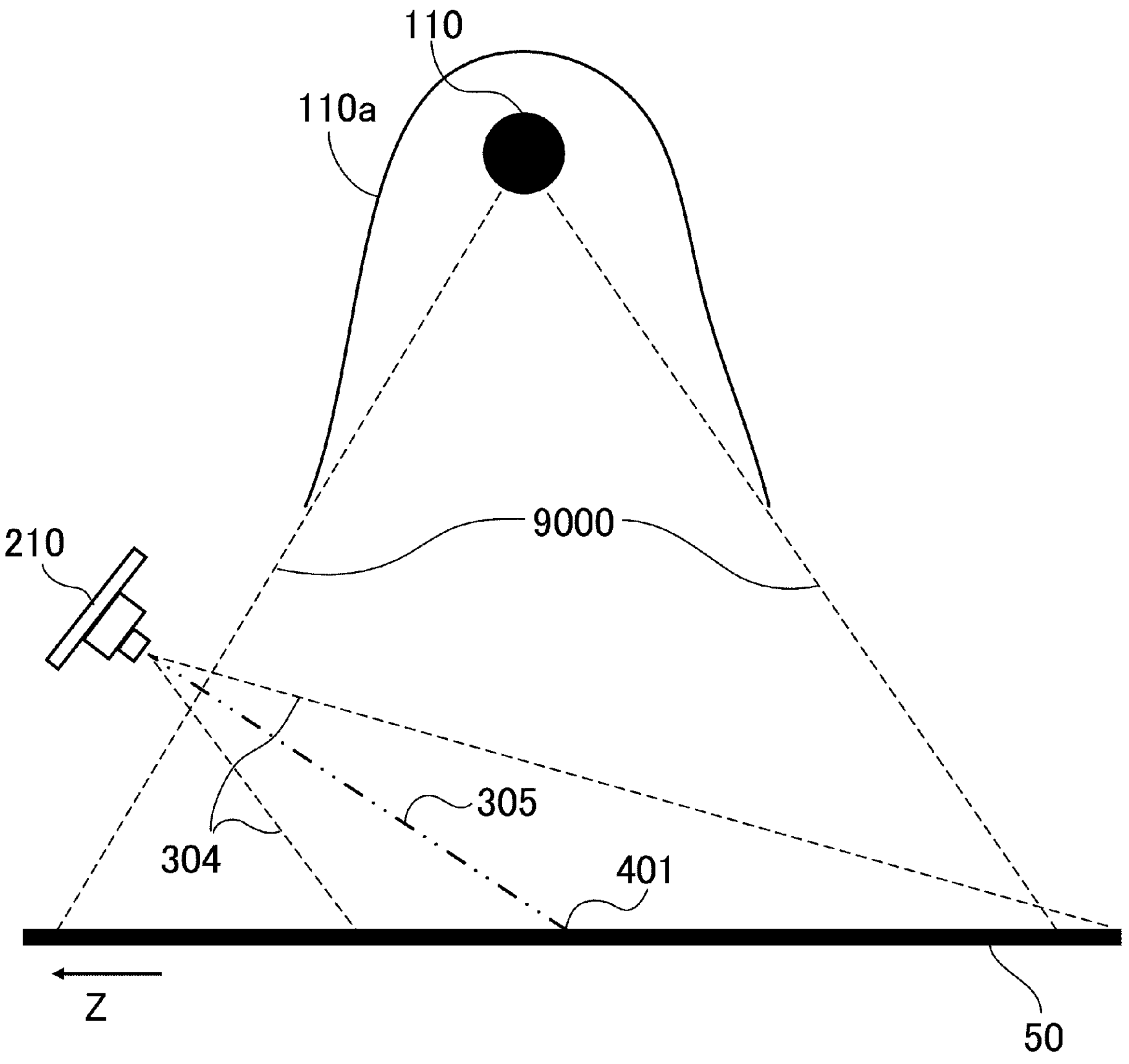

FIG. 6 is a schematic view illustrating an example in which the temperature sensor for the upper heater is disposed closer to the upper belt.

Figure 7:
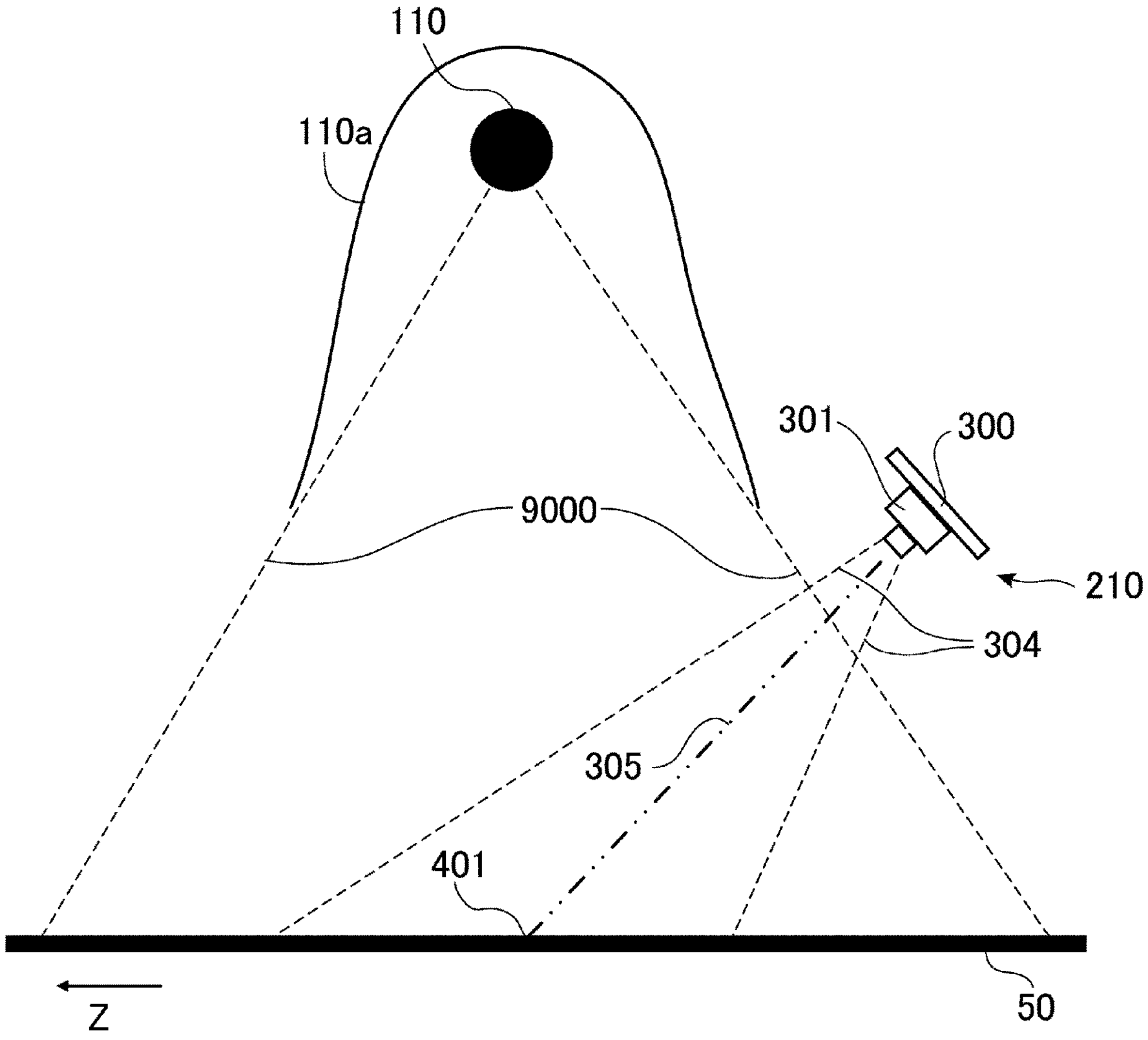

FIG. 7 is a schematic view illustrating an example in which the temperature sensor for the upper heater is disposed on an upstream side.

Figure 8:
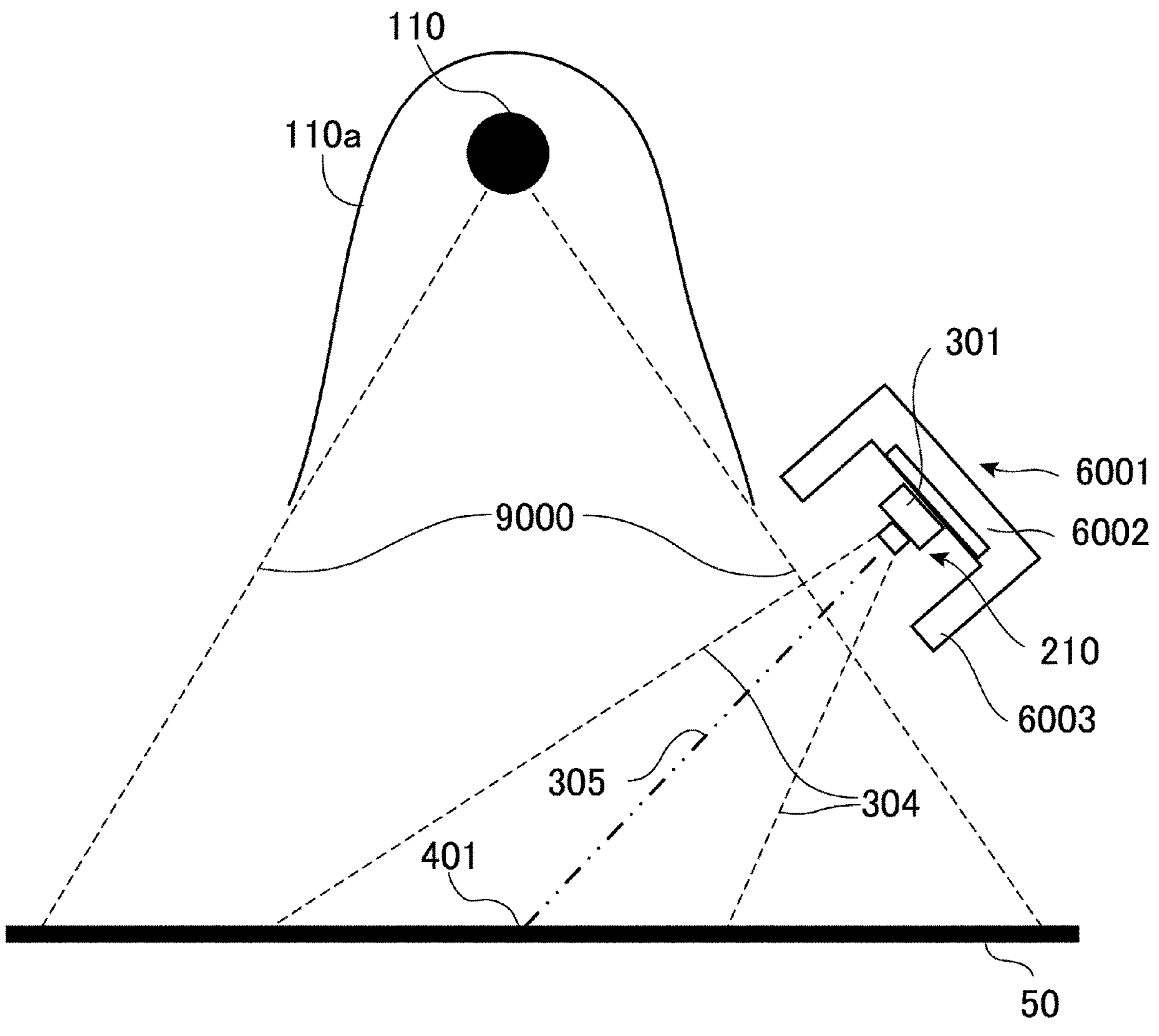

FIG. 8 is a view describing a holder.

Figure 9:
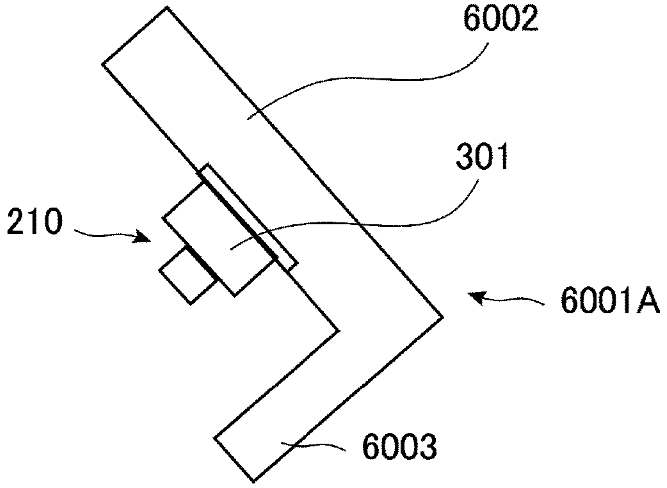
Figure 9:
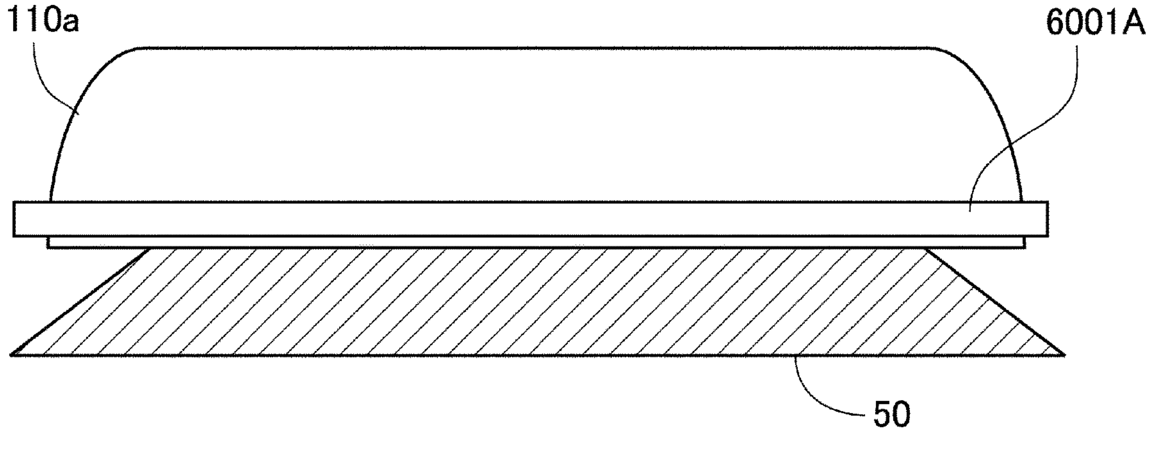

Part (a) of FIG. 9 is view illustrating another example of the holder and part (b) of FIG. 9 is a view of the holder as viewed from an upstream side of a reflector.

Figure 10:
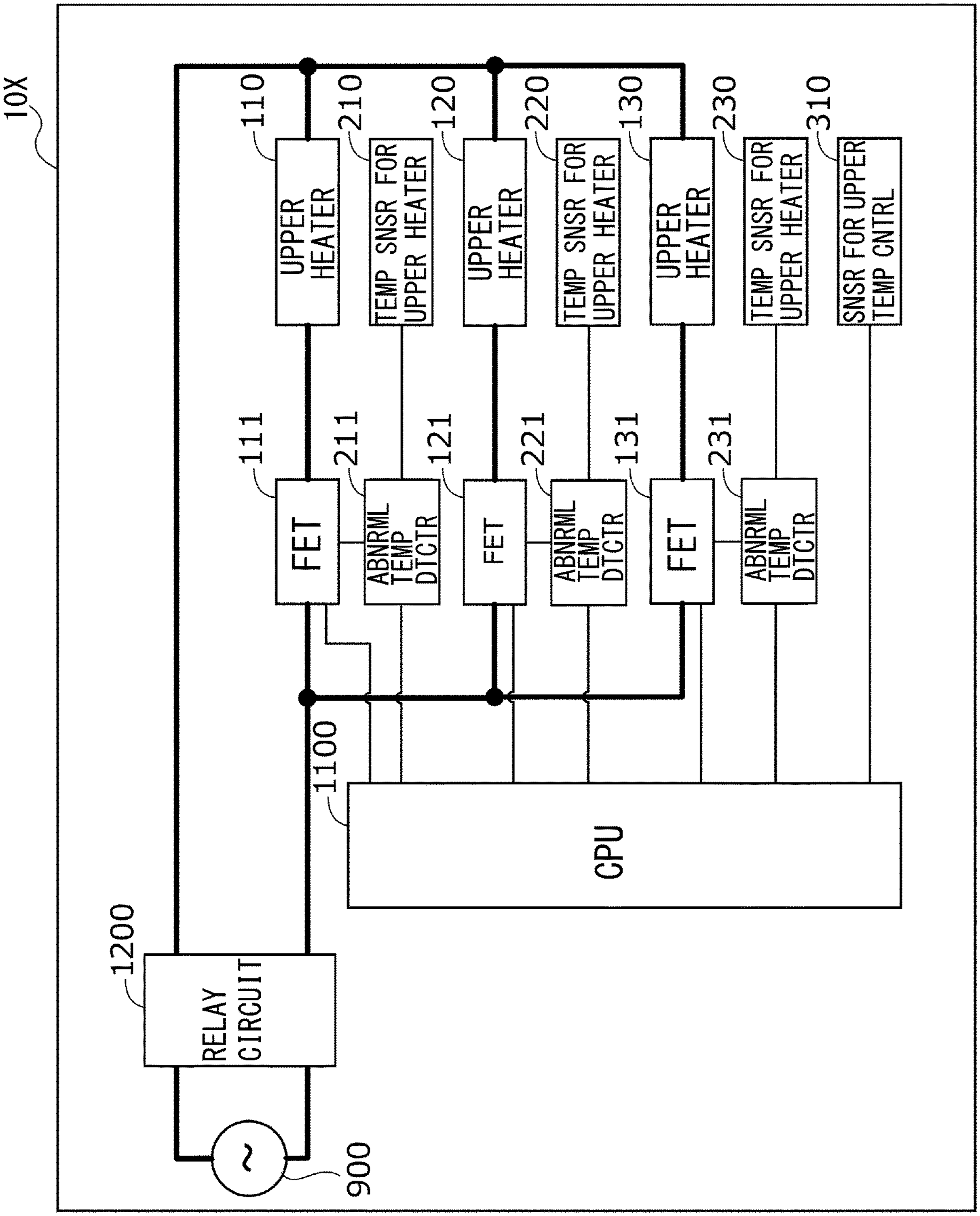

FIG. 10 is control block diagram illustrating a temperature control system for the upper heater of the Embodiment 1.

Figure 11:
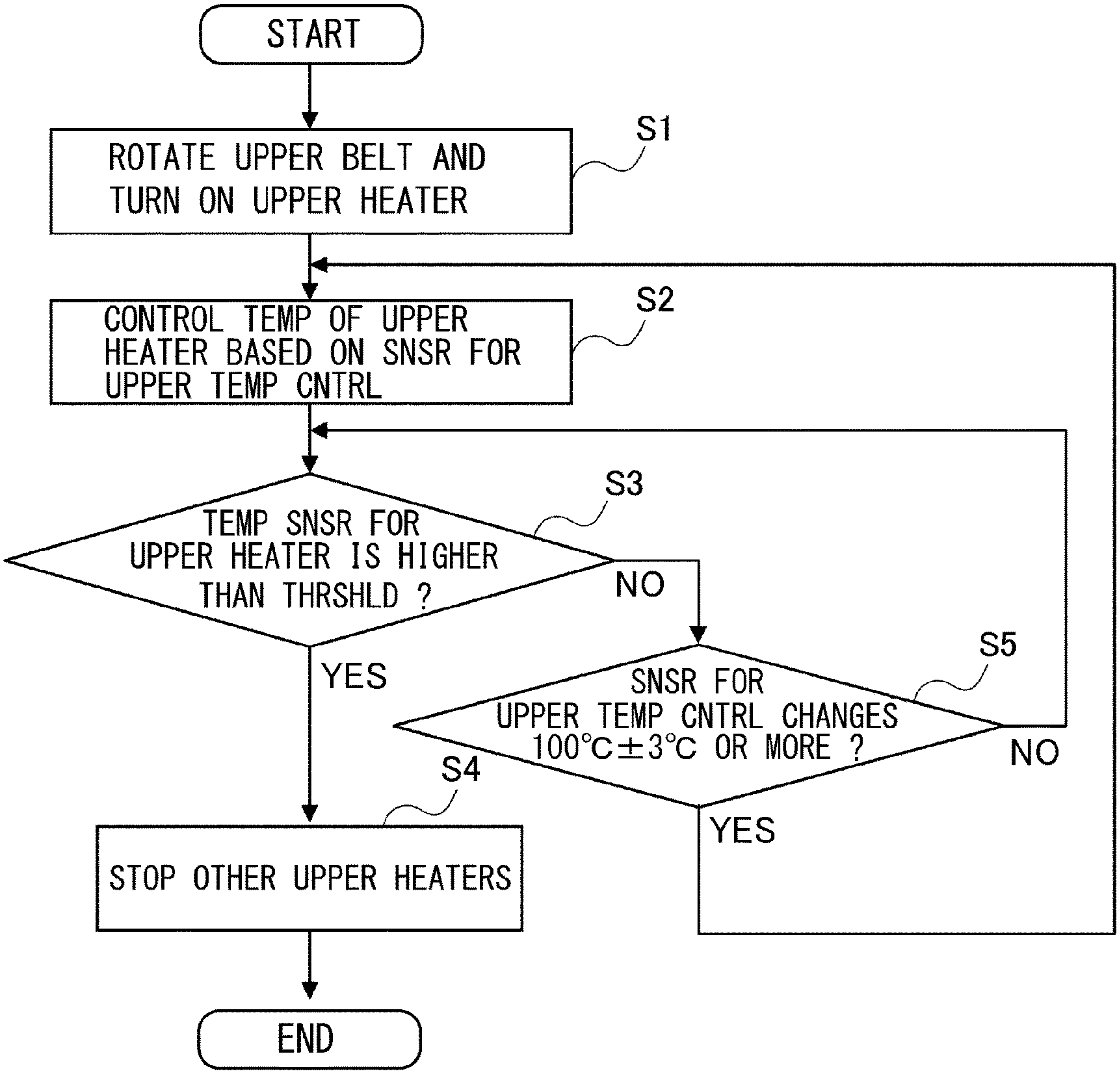

FIG. 11 is a flow chart diagram illustrating a control process for the upper heater of the Embodiment 1.

Figure 12:
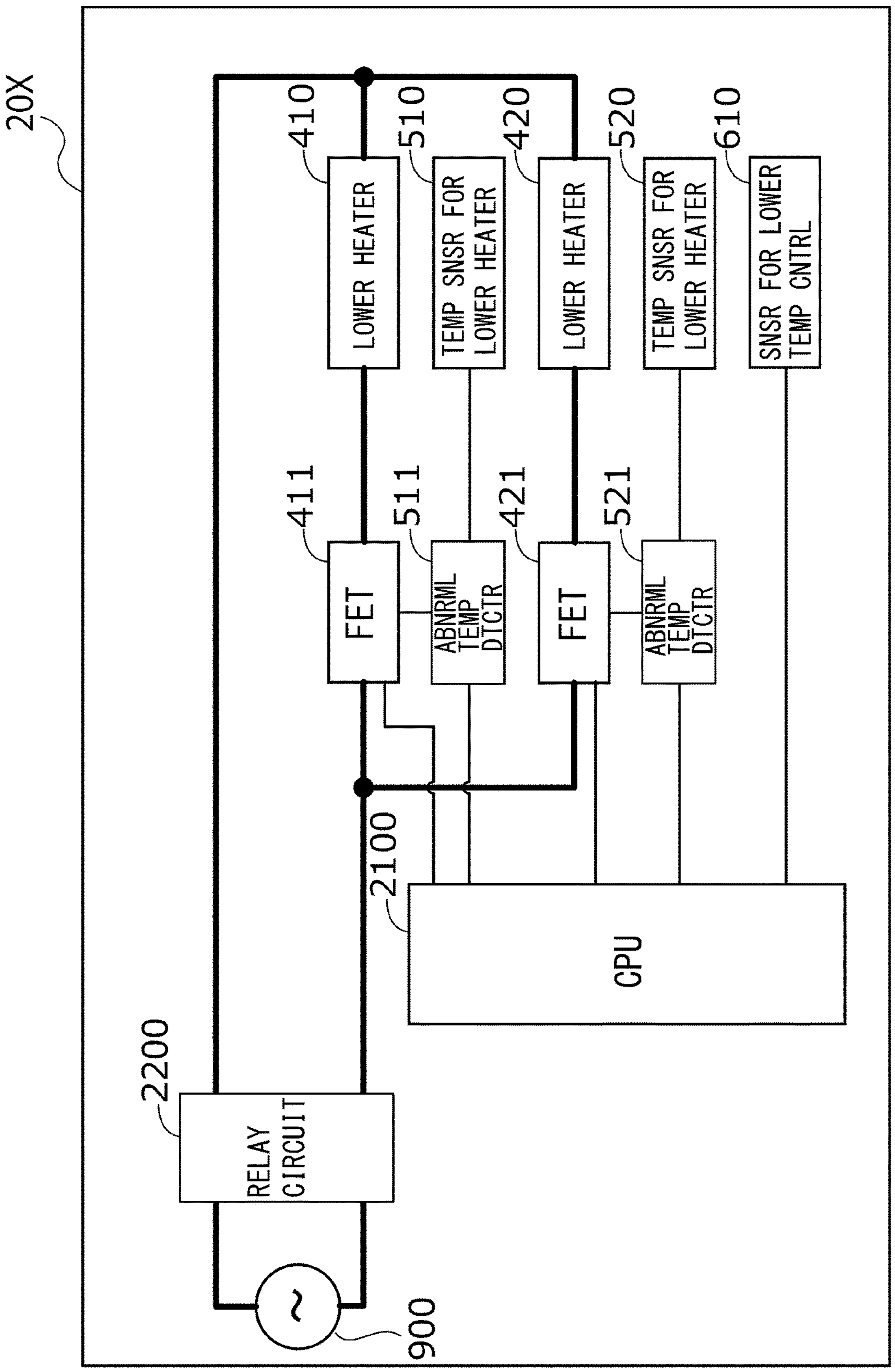

FIG. 12 is a control block diagram illustrating a temperature control system for a lower heater of the Embodiment 1.

Figure 13:
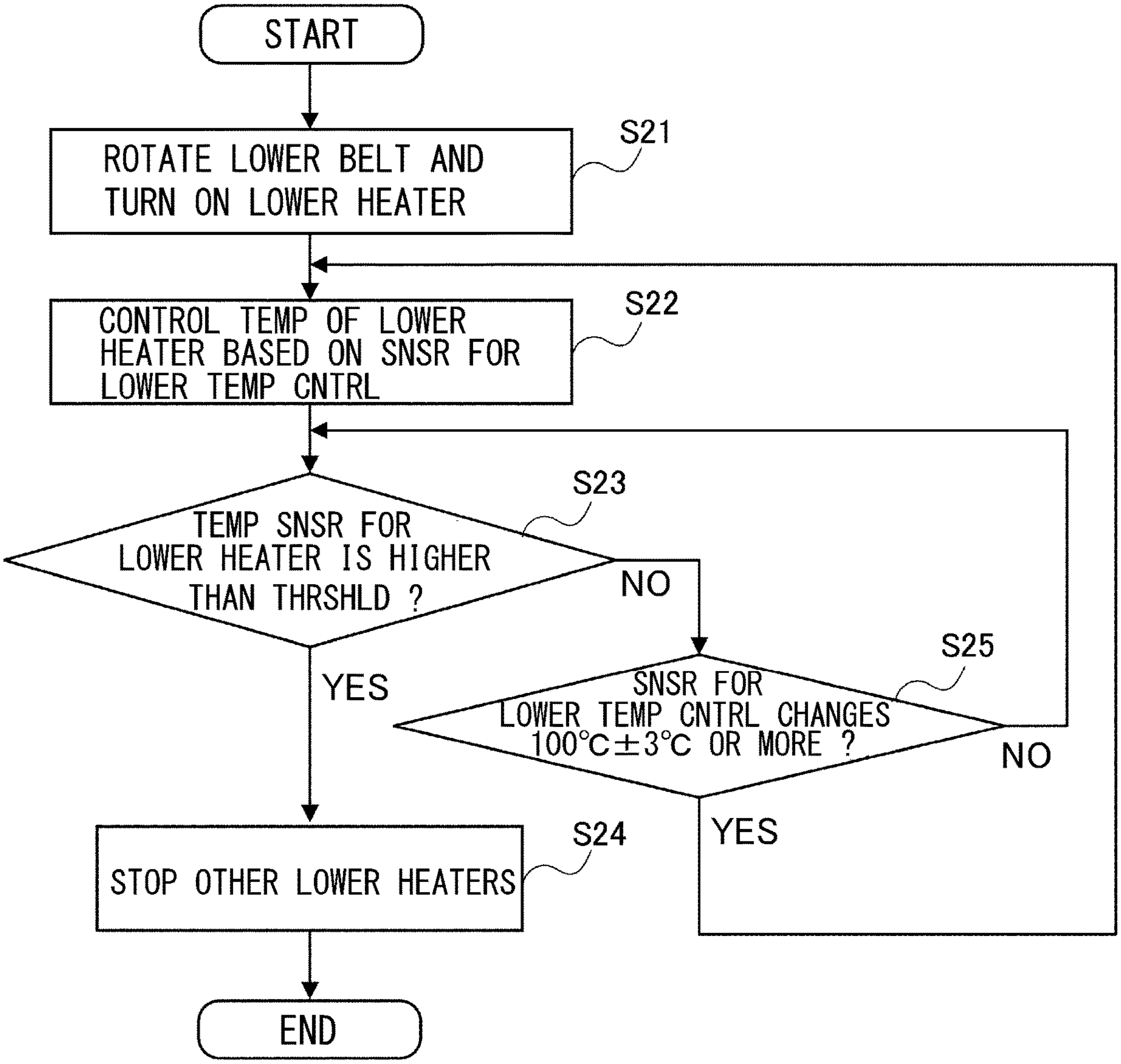

FIG. 13 is a flow chart diagram illustrating a control process for the lower heater of the Embodiment 1.

Figure 14:
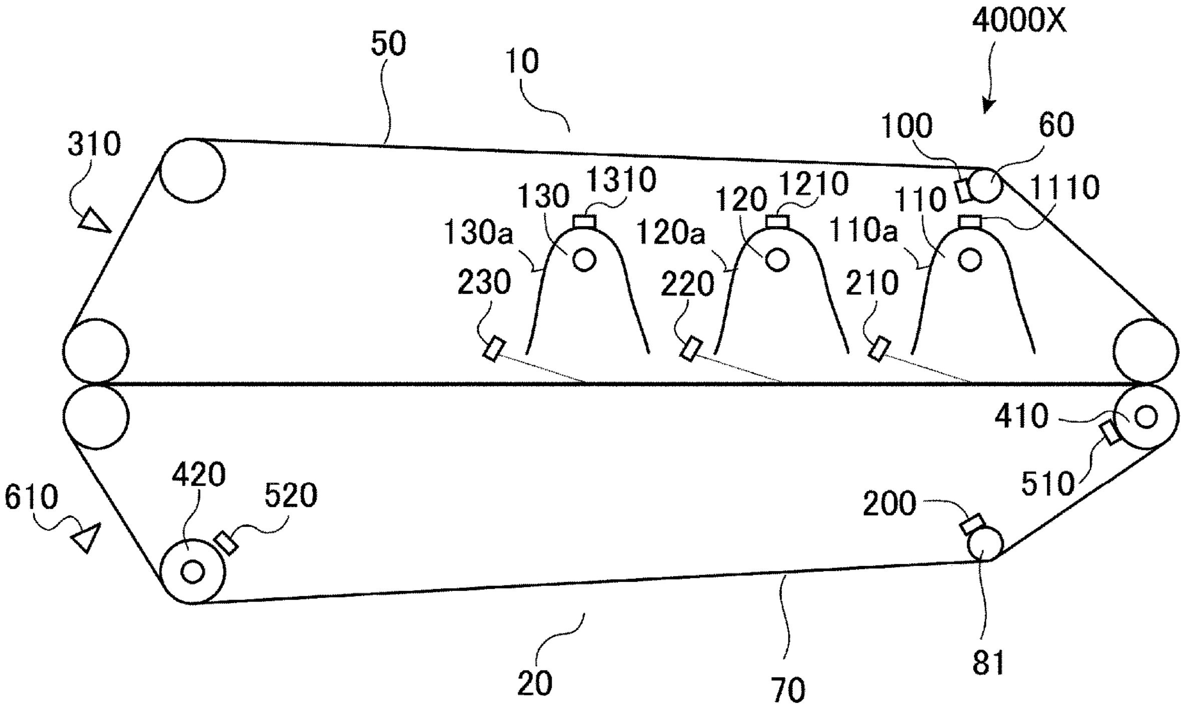

FIG. 14 is a schematic view illustrating a fixing belt unit of an Embodiment 2.

Figure 15:
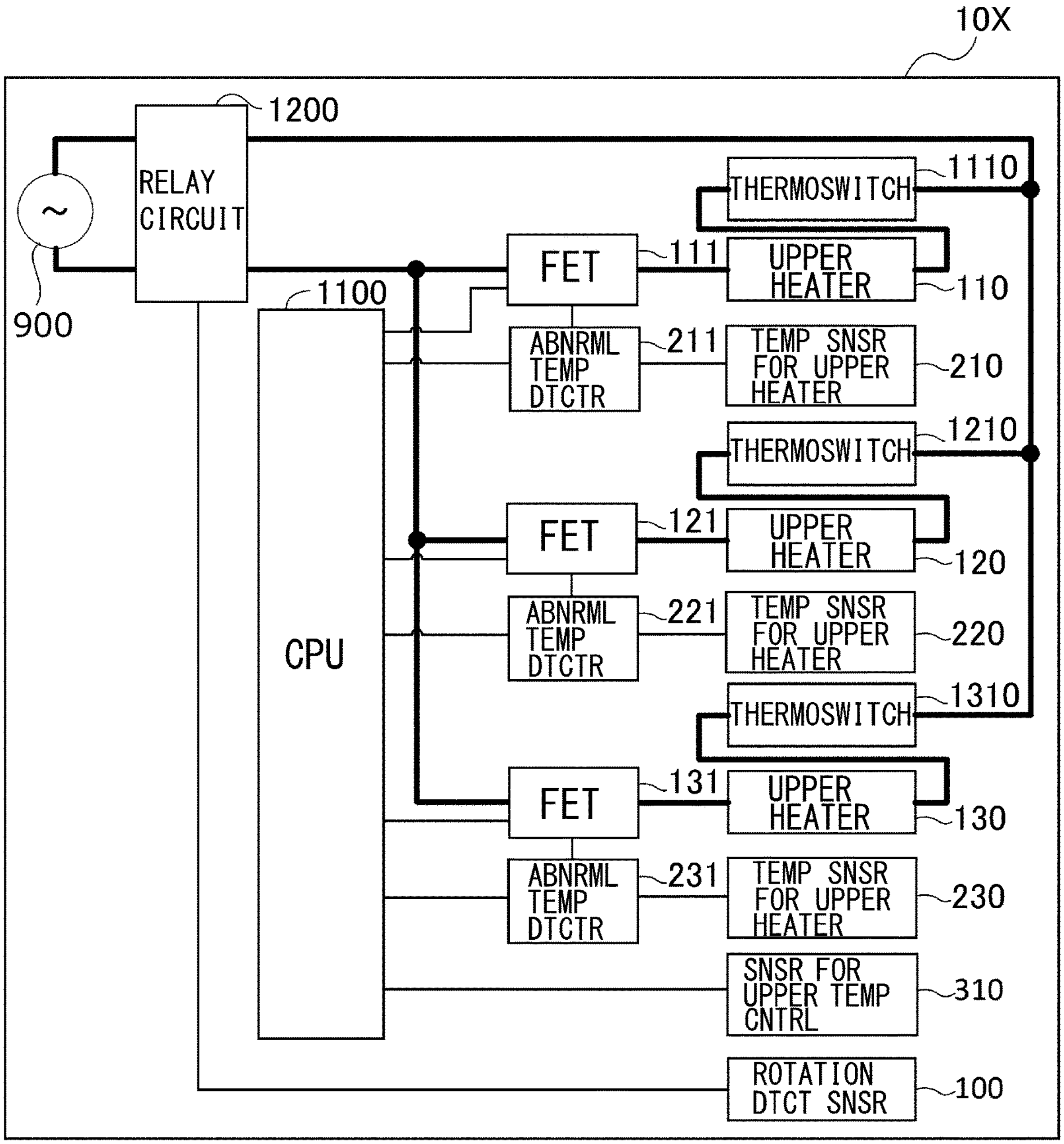

FIG. 15 is a control block diagram illustrating a temperature control system for an upper heater of the Embodiment 2.

Figure 16:
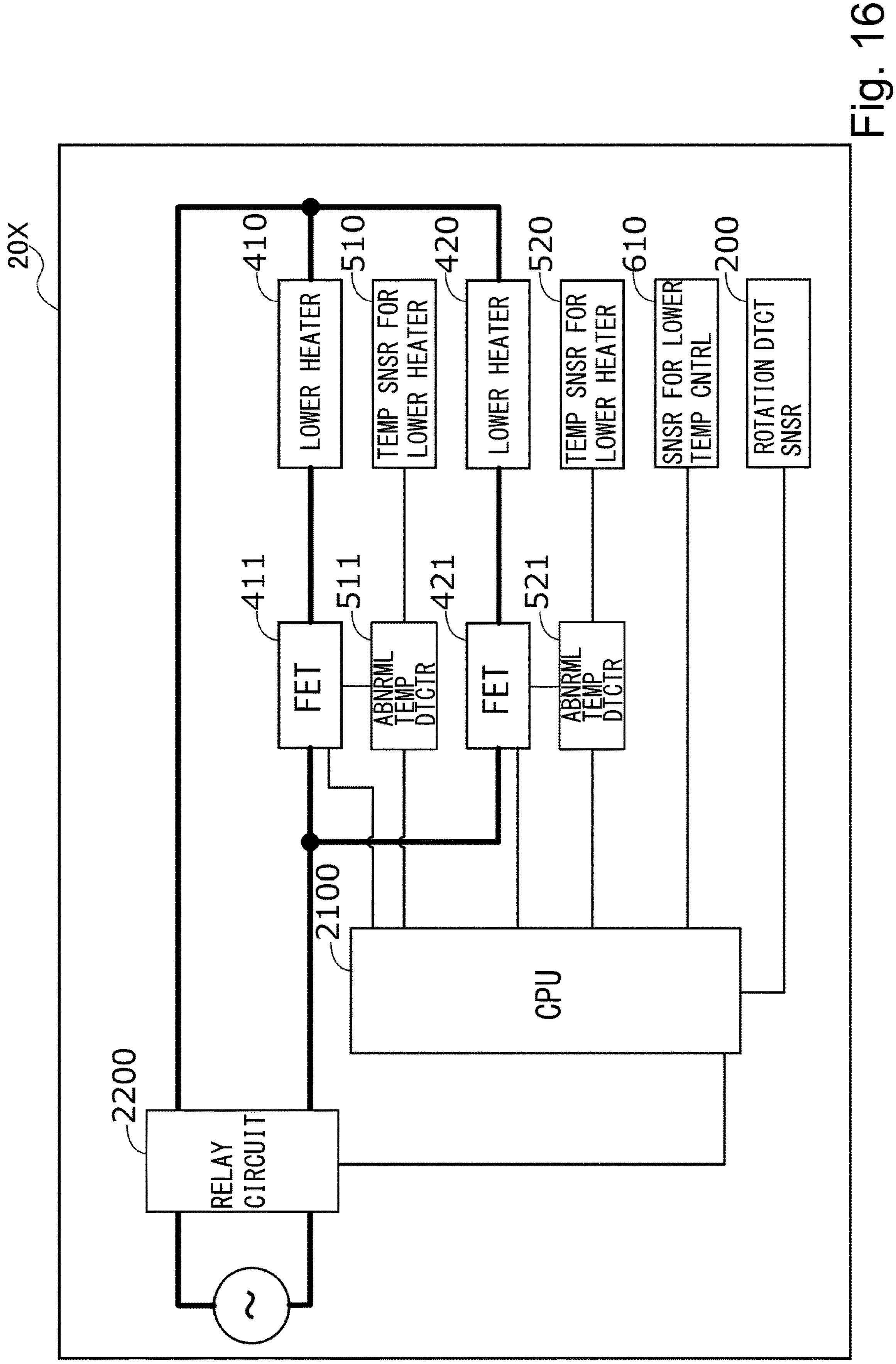

FIG. 16 is a control block diagram illustrating a temperature control system for a lower heater of the Embodiment 2.

Figure 17:
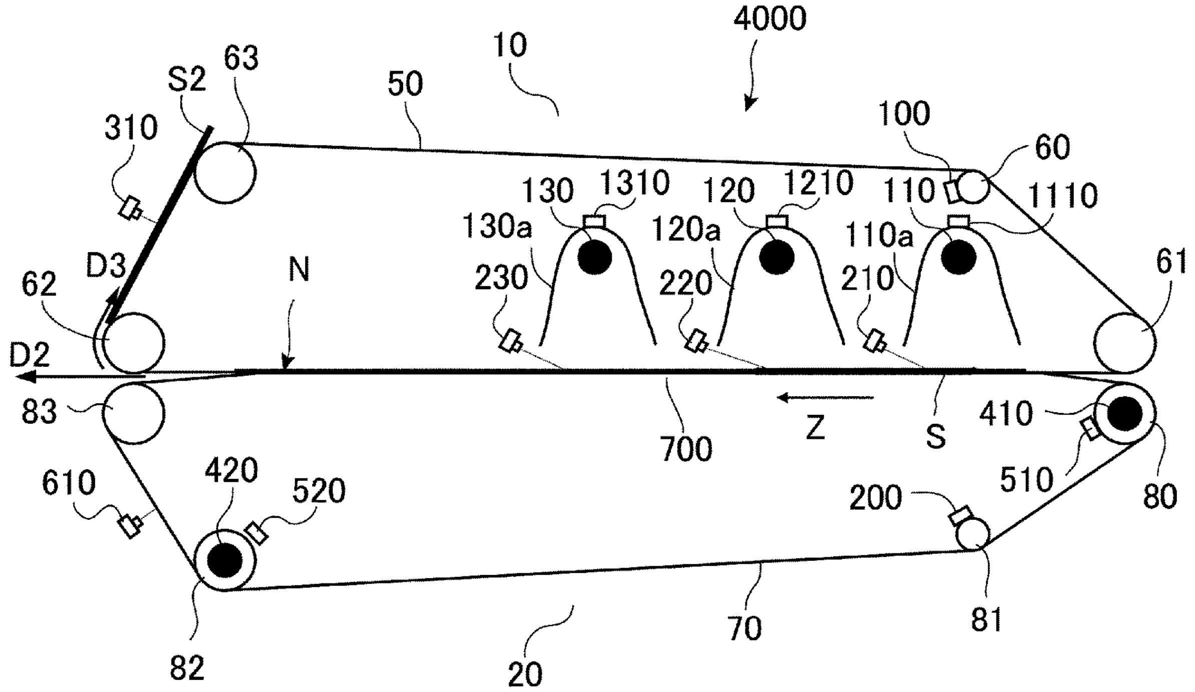

FIG. 17 is a schematic view illustrating a case in which a winding of a sheet to an upper belt unit occurs.

Figure 18:
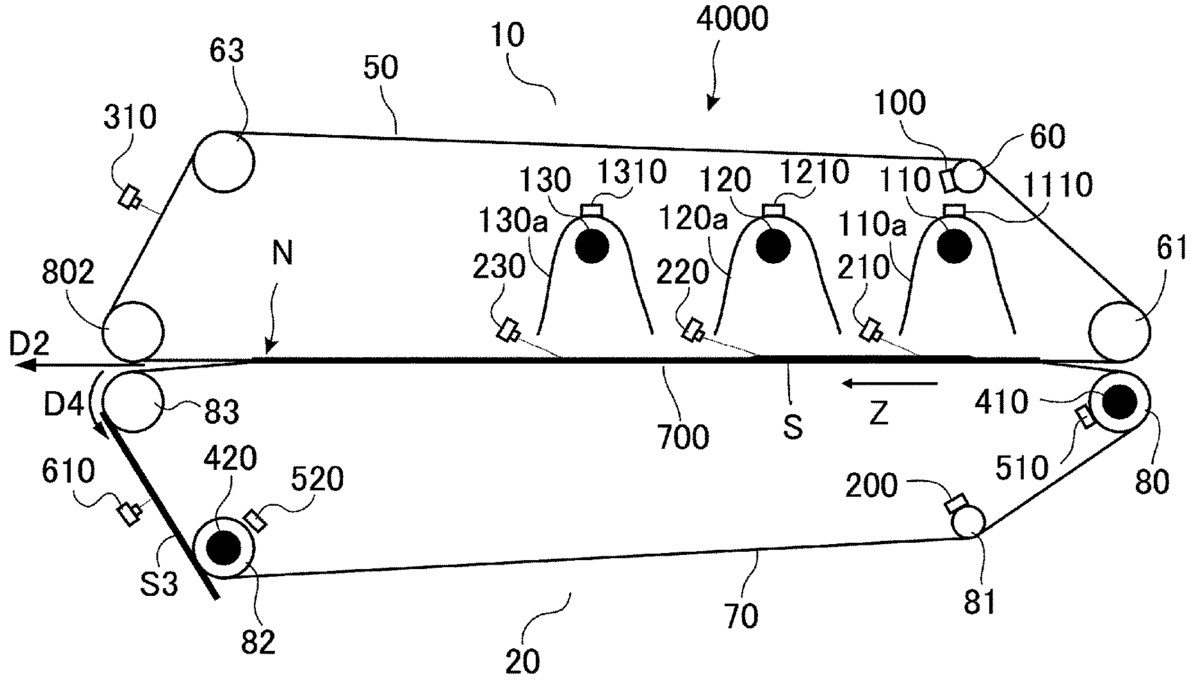

FIG. 18 is a schematic view illustrating a case in which the winding of the sheet to a lower belt unit occurs.

Figure 19:
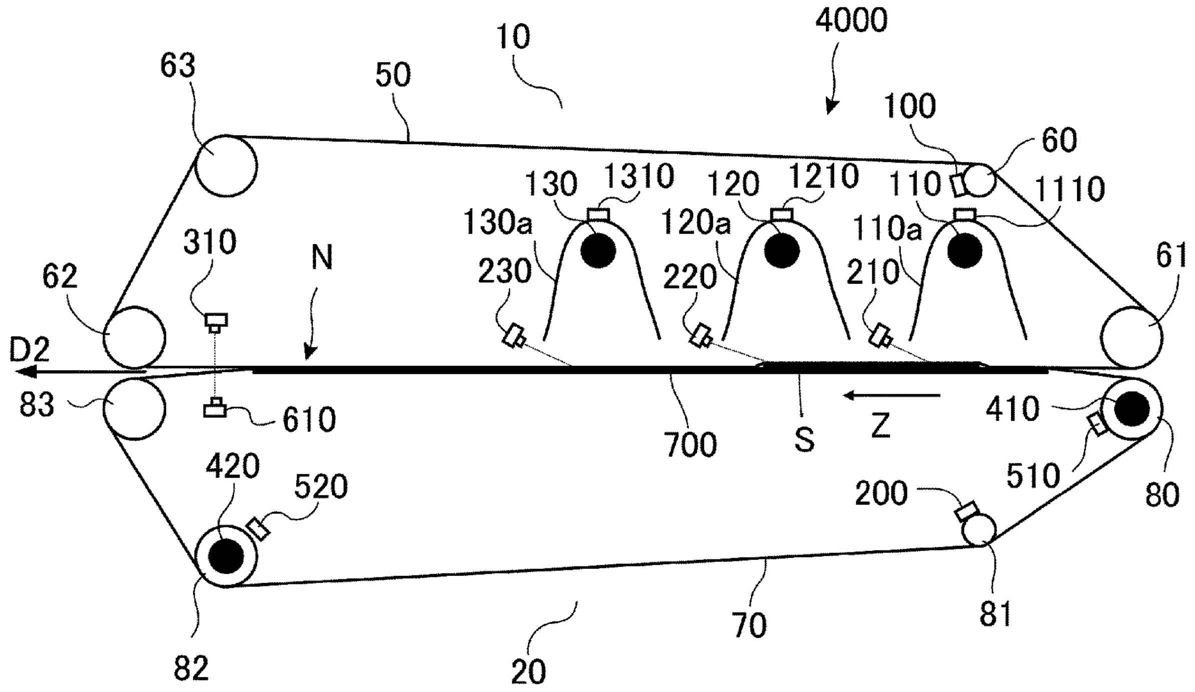

FIG. 19 is a schematic view illustrating a fixing belt unit of an Embodiment 3.

Figure 20:
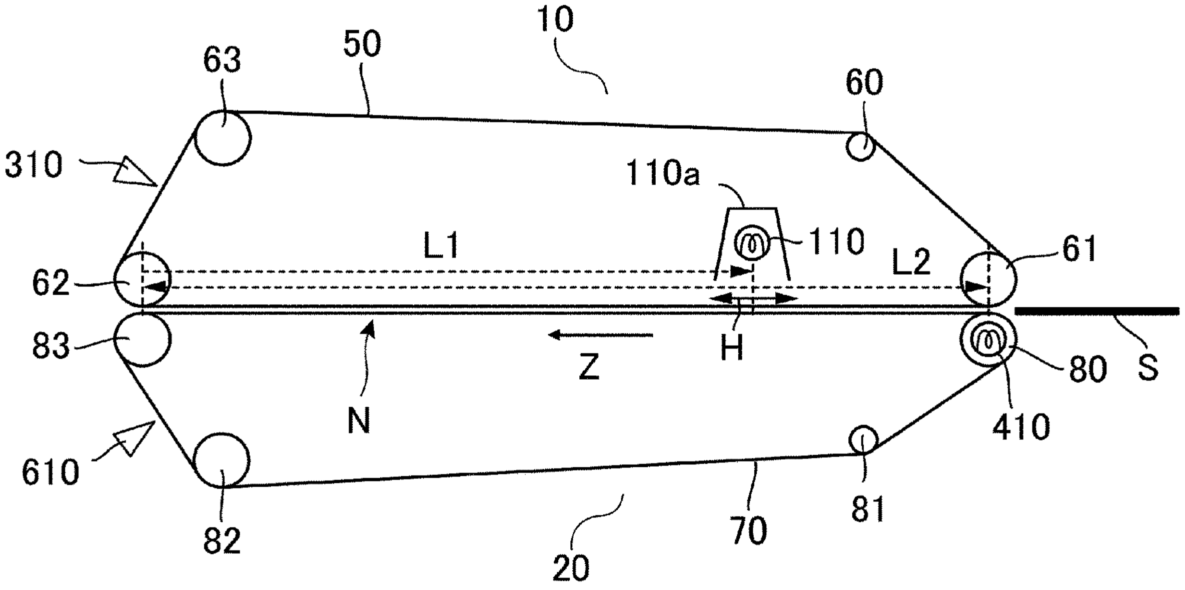

FIG. 20 is a schematic view describing an arranging position of the upper heater of another Embodiment.

Figure 21:
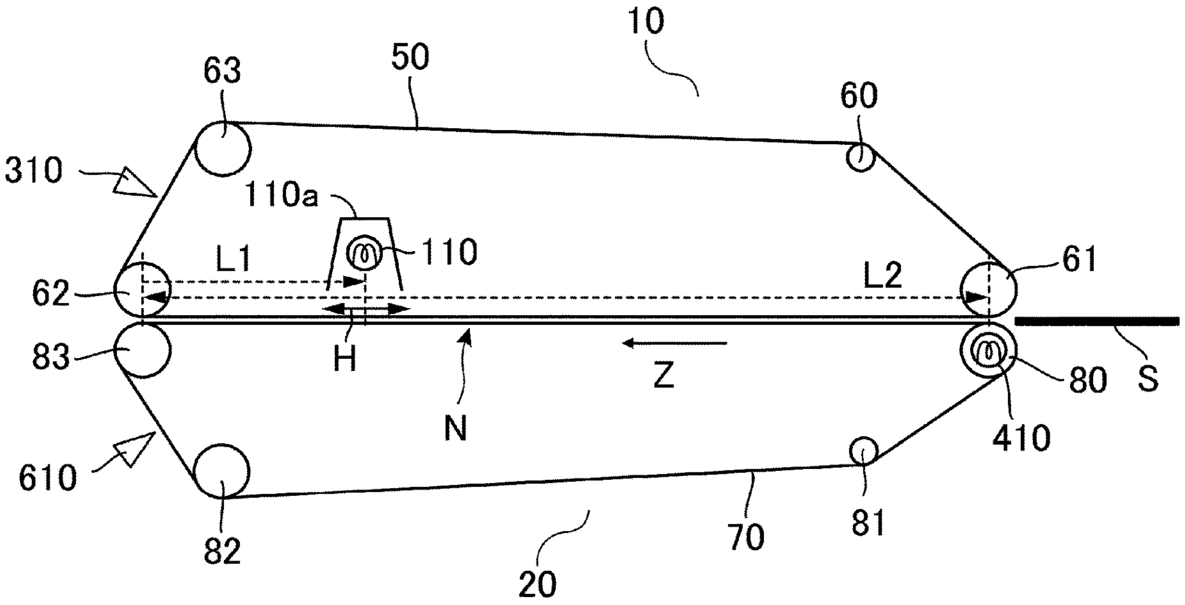

FIG. 21 is a schematic view describing an arranging position of the upper heater of a Comparative Example 1.

Figure 22:
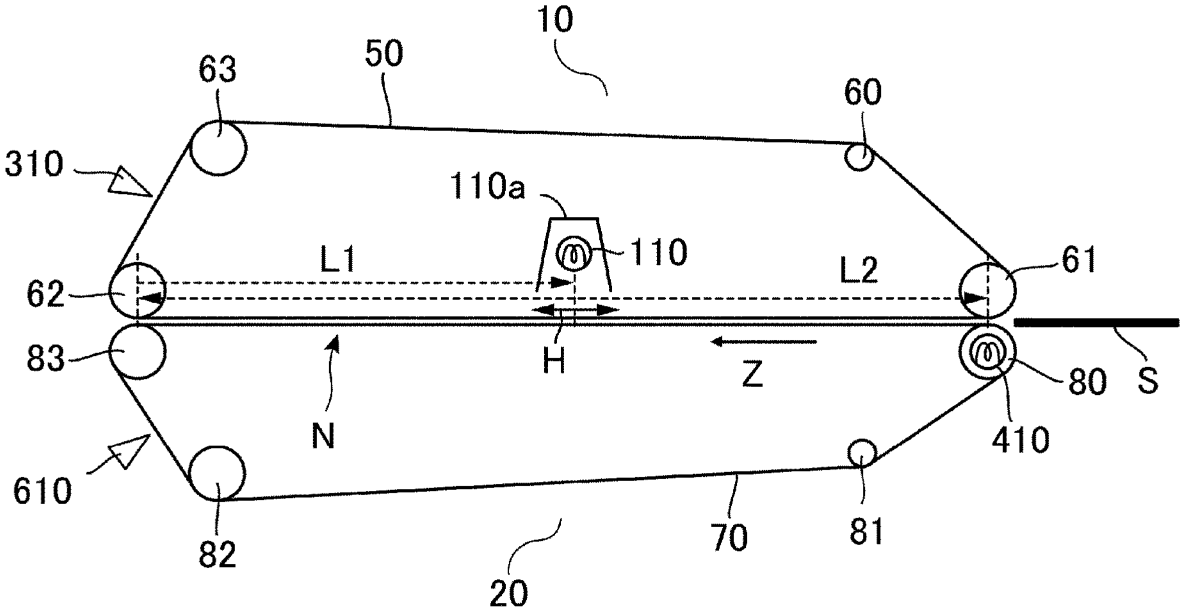

FIG. 22 is a schematic view describing an arranging position of the upper heater of a Comparative Example 2.

Figure 23:
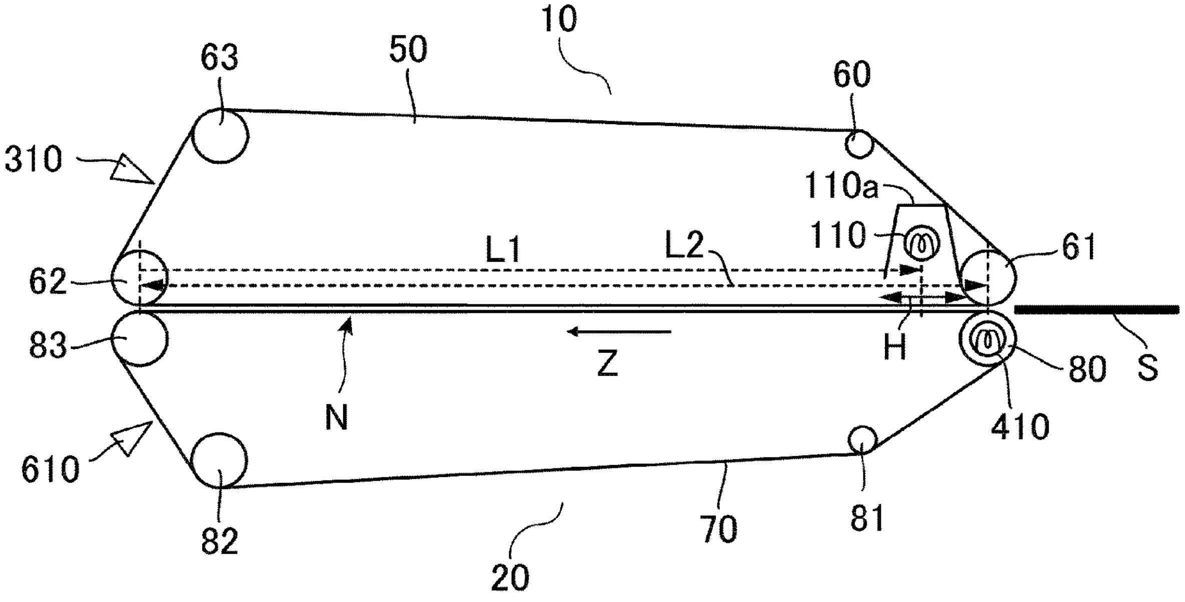

FIG. 23 is a schematic view describing an arranging position of the upper heater of a Comparative Example 3.

Figure 24:
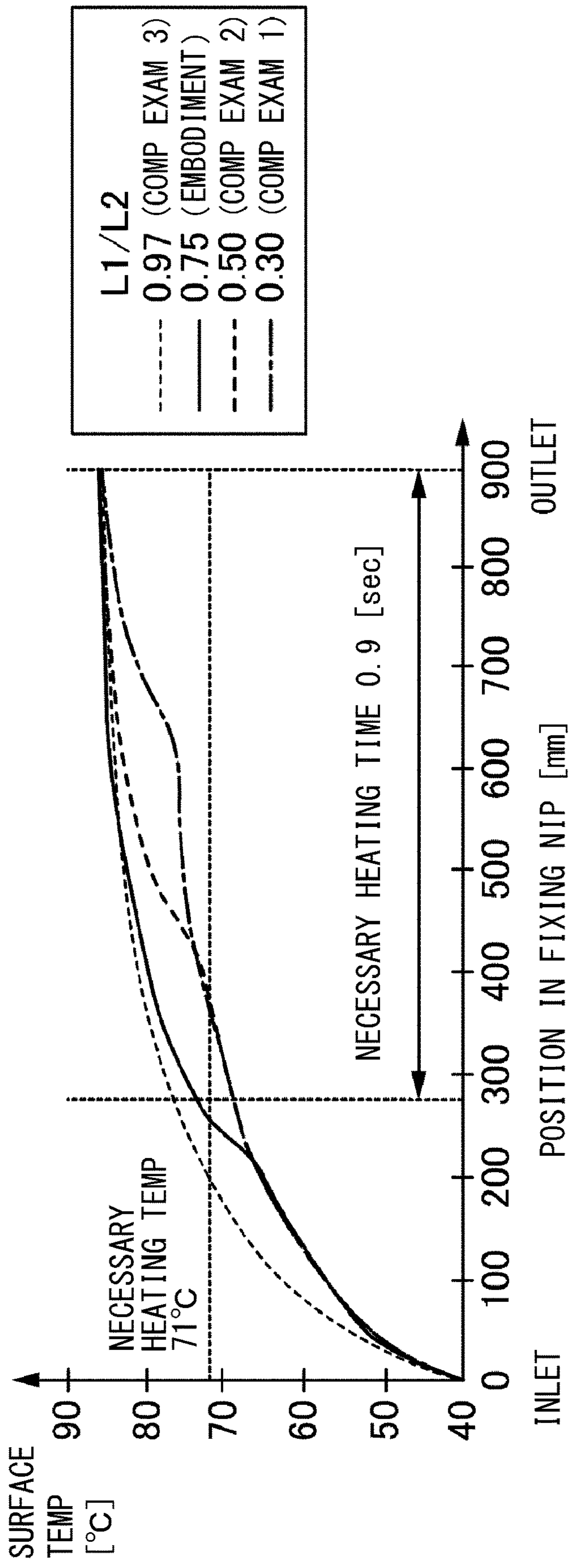

FIG. 24 is a graph illustrating transition of a surface temperature of the sheet passing through a fixing nip portion for each heater arrangement of the other Embodiment and the Comparative Examples 1 through 3.

Figure 25:
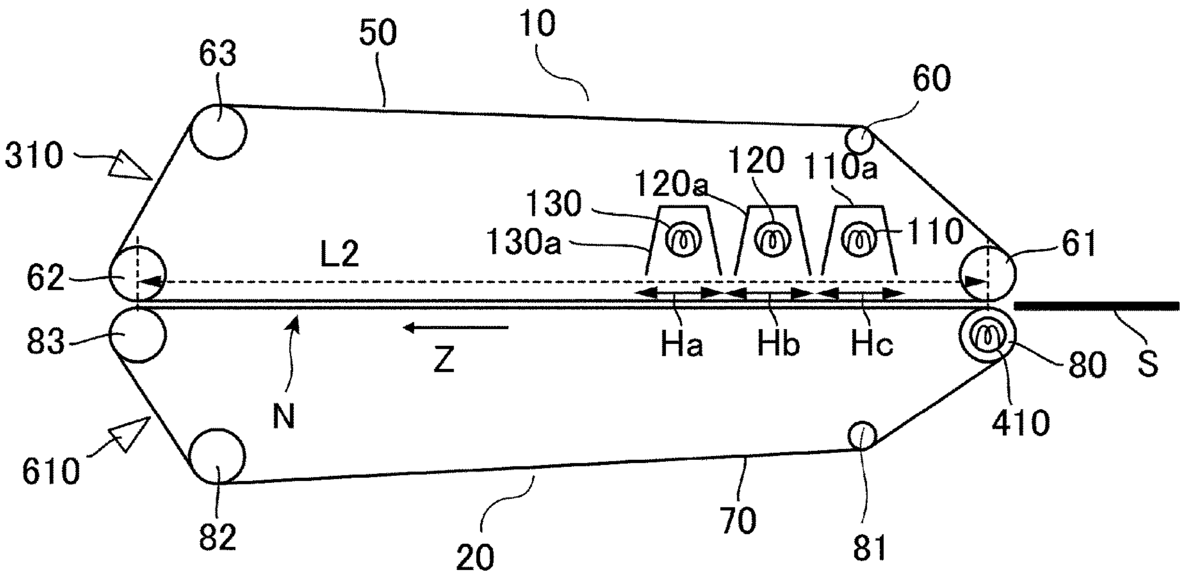

FIG. 25 is a schematic view describing arranging positions of a plurality of the upper heaters.

Figure 26:
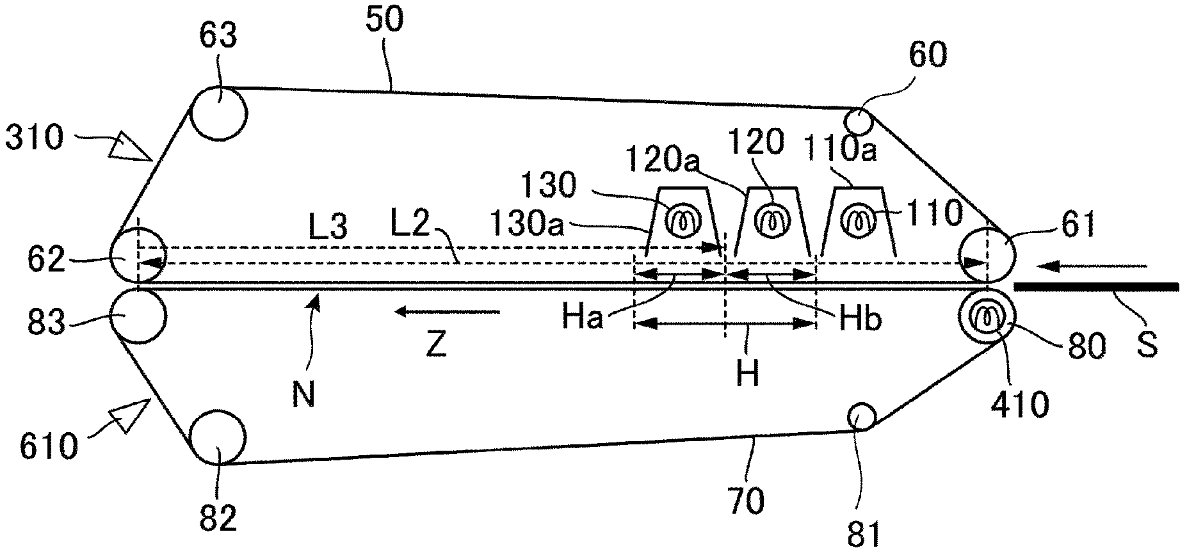

FIG. 26 is a schematic view for describing irradiation areas by the plurality of the upper heaters.

DESCRIPTION OF THE EMBODIMENTS

Embodiment 1

<Image Forming Apparatus>

Figure 1:
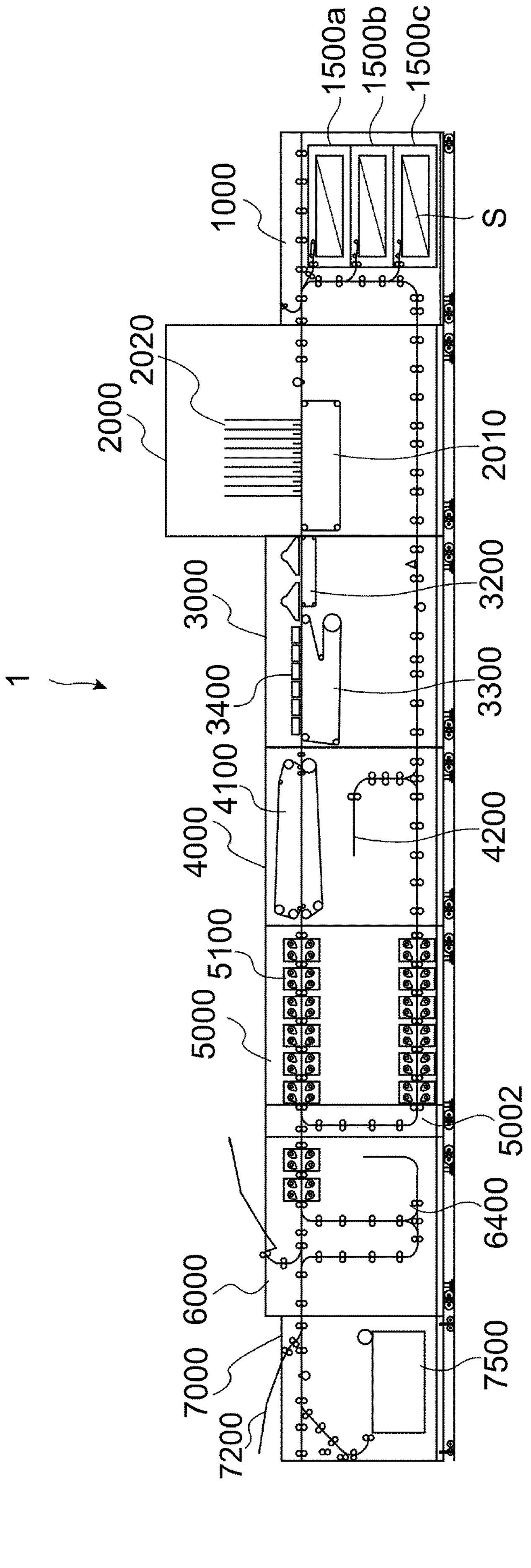
FIG. 1 is a schematic view illustrating an ink jet recording apparatus of an Embodiment 1.

Hereinafter, the present Embodiment will be described in detail with reference to the drawings. FIG. 1 is a schematic view illustrating an ink jet recording apparatus of the present Embodiment. An ink jet recording apparatus 1 is the ink jet recording apparatus of a so-called sheet-feeding type which forms an ink image on a sheet using two liquids of a reaction fluid and ink. The sheet can be any recording material as long as it can accept the ink, for example, a paper such as a plain paper and a thick paper, a plastic film such as a sheet for an overhead projector, a special shaped sheet such as an envelope and an index paper, cloth, etc.

As shown in FIG. 1, the ink jet recording apparatus 1 of the present Embodiment is provided with a sheet feeding module 1000, a printing module 2000, a drying module 3000, a fixing module 4000, a cooling module 5000, a reversing module 6000 and a stacking module 7000. Onto a sheet S fed from the sheet feeding module 1000, various processes are performed while being conveyed in each module along a conveyance path, and the sheet S is finally discharged to the stacking module 7000.

Incidentally, the sheet feeding module 1000, the printing module 2000, the drying module 3000, the fixing module 4000, the cooling module 5000, the reversing module 6000 and the stacking module 7000 each has a separate housing, and these housings may be connected to constitute the ink jet recording apparatus 1. Alternatively, the sheet feeding module 1000, the printing module 2000, the drying module 3000, the fixing module 4000, the cooling module 5000, the reversing module 6000 and the stacking module 7000 may be disposed in one housing.

The sheet feeding module 1000 is provided with storages 1500*a*, 1500*b* and 1500*c* to accommodate the sheet S, and the storages 1500*a* through 1500*c* are provided to be drawable to a front side of the apparatus to accommodate the sheet S. The sheet S is fed one by one by a separating belt and a conveyance roller in each of the storages 1500*a* through 1500*c*, and is conveyed to the printing module 2000. Incidentally, the storages are not limited to the three storages 1500*a* through 1500*c*, but one, two or four or more storages may be provided.

The printing module 2000 as an image forming portion is provided with a pre-image-forming registration correcting portion (not shown), a printing belt unit 2010 and a recording portion 2020. The sheet S conveyed from the sheet feeding module 1000 is conveyed to the printing belt unit 2010 after a tilt and a position thereof are corrected by the pre-image-forming registration correcting portion. With respect to the conveyance path, the recording portion 2020 is disposed in a position opposite to the printing belt unit 2010. The recording portion 2020 forms an image by discharging the ink onto the sheet S by a recording head from above with respect to the sheet S being conveyed. A plurality of recording heads which discharge the ink are disposed in line with each other along a conveyance direction. In the present Embodiment, a total of five recording heads of line-type corresponding to the four colors of Y (yellow), M (magenta), C (cyan) and Bk (black), as well as the reaction fluid are provided. The sheet S is suctioned and conveyed by the printing belt unit 2010 to ensure clearance with the recording heads.

Incidentally, the number of colors of the ink and the number of the recording heads are not limited to five as described above. As an inkjet type, a type using a heat-generating element, a type using a piezoelectric element, a type using an electrostatic element, a type using a MEMS element, etc. can be employed. The inks of each color are supplied to the recording heads from unshown ink tanks via ink tubes, respectively. The ink contains "0.1 weight % to 20.0 weight %" of resin component, water and water-soluble organic solvent, a coloring agent, wax, additives, etc., based on a total ink mass.

When the sheet S, on which the image is formed by the recording portion 2020, is conveyed by the printing belt unit 2010, detection of misalignment or color density of the image formed on the sheet by an in-line scanner (not shown), which is disposed on a downstream side of the recording portion 2020 in the conveyance direction of the sheet S, is performed. Based on this misalignment and the color density of the image, correction of the image, density, etc. formed on the sheet is performed.

The drying module 3000 is provided with a decoupling portion 3200, a drying belt unit 3300 and a hot air blowing portion 3400. The drying module 3000 reduces liquid content of the ink and the reaction fluid which are applied to the sheet S in order to improve fixing performance of the ink to the sheet S by the subsequent fixing module 4000. The sheet S, on which the image is formed, is conveyed to the decoupling portion 3200, which is disposed inside the drying module 3000. In the decoupling portion 3200, frictional force is generated between the sheet S and a belt by wind pressure of wind blown from above, and the sheet S is conveyed by the belt. Thus, it is configured to prevent misalignment of the sheet S upon being conveyed across the printing belt unit 2010 and the decoupling portion 3200 by conveying the sheet S placed on the belt with the frictional force. The sheet S conveyed from the decoupling portion 3200 is suctioned and conveyed by the drying belt unit 3300, and the ink and the reaction liquid applied to the sheet S is dried by the hot air blown from the hot air blowing portion 3400 disposed above the belt.

By this, it becomes possible to suppress so-called cockling to occur, which is a phenomenon in which a line like a fringe is generated by the ink being splashed out onto the sheet S, by the ink and the reaction fluid applied to the sheet S being heated and evaporation of the liquid content thereof being promoted by the drying module 3000. Incidentally, as the drying module 3000, any device can be used as long as the device can heat and dry, however, a hot air dryer or a heater is preferable, for example. As the heater, heating with electric heating wire or an infrared ray heater, for example, is preferable in terms of safety and energy efficiency.

The fixing module 4000 is provided with a fixing belt unit 4100. The fixing belt unit 4100 fixes the ink onto the sheet S by passing the sheet S, which is conveyed from the drying module 3000, through between a heated upper belt unit and a lower belt unit. As to the fixing belt unit 4100, detailed description will be given below.

The cooling module 5000 is provided with a plurality of cooling portions 5100, and the hot sheet S, which is conveyed from the fixing module 4000, is cooled by the cooling portions 5100. The cooling portion 5100 cools the sheet S by sucking outside air into a cooling box with a fan to increase pressure in the cooling box and directing air blowing from the cooling box via a nozzle due to the pressure to the sheet S, for example. The cooling portions 5100 are disposed on both sides with respect to the conveyance path of the sheet S, and cool both sides of the sheet S.

The cooling module 5000 is provided with a conveyance path switching portion 5002. The conveyance path switching portion 5002 switches the conveyance path of the sheet S according to a case in which the sheet S is conveyed to the reversing module 6000 and a case in which the sheet S is conveyed to a double-side conveyance path for a double-side printing to form the images on both sides of the sheet S.

The reversing module 6000 is provided with a reversing portion 6400. The reversing portion 6400 reverses a front and a back of the sheet S being conveyed and changes front and back orientation of the sheet S upon being discharged to the stacking module 7000. The stacking module 7000 is provided with a top tray 7200 and a stacking portion 7500, and stacks the sheet S conveyed from the reversing module 6000.

In a case of the double-side printing, the sheet S is conveyed to a lower part of the conveyance path of the cooling module 5000 by the conveyance path switching portion 5002. The sheet S is then returned to the printing module 2000 through the double-side conveyance path of the fixing module 4000, the drying module 3000, the printing module 2000 and the sheet feeding module 1000. In a double-side conveyance portion of the fixing module 4000, a reversing portion 4200 is provided to reverse the front and the back of the sheet S. To the sheet S returned to the printing module 2000, the image is formed by the ink on the other side thereof on which the image is not formed, and is discharged to the stacking module 7000 through the drying module 3000, the fixing module 4000, the cooling module 5000 and the reversing module 6000.

Figure 2:
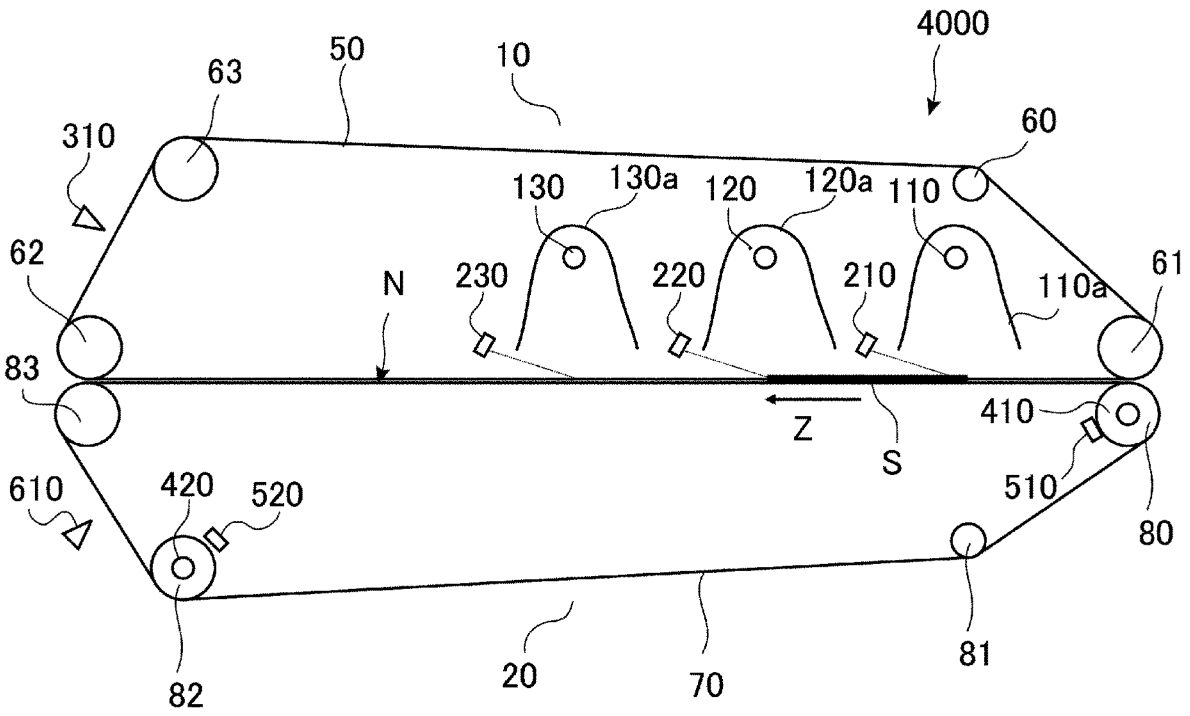
FIG. 2 is a schematic view illustrating a fixing belt unit of the Embodiment 1.

Next, an overview of the fixing module 4000 of the present Embodiment will be described using FIG. 2. As shown in FIG. 2, the fixing module 4000 is provided with an upper belt unit 10 and a lower belt unit 20. The sheet S is nipped and conveyed by the upper belt unit 10 and the lower belt unit 20, during which pressure and heat are applied to fix the image formed by the ink to the sheet S.

<Upper Belt Unit>

The upper belt unit 10 is provided with an upper belt 50 as a first belt, a plurality of stretching rollers 60, 61, 62 and 63, which rotatably stretch the upper belt 50, upper heaters 110, 120 and 130 as belt heaters (a first and a second belt heaters), a sensor for upper temperature control 310, and temperature sensors for the upper heaters 210, 220 and 230. At least one of the plurality of stretching rollers 60, 61, 62 and 63 is a driving roller which drives the endless upper belt 50. The upper heaters 110, 120 and 130 are disposed in an inner circumferential side of the upper belt 50 in a non-contact manner, and emit infrared rays.

The upper heaters 110, 120 and 130 are covered by reflectors (a first and a second reflectors) 110*a*, 120*a* and 130*a*. The reflectors 110*a*, 120*a* and 130*a* efficiently heat the upper belt 50 by reflecting the infrared rays (radiation heat) emitted from the upper heaters 110, 120 and 130 and irradiating the infrared rays toward the fixing nip portion N of the upper belt 50. On one side surface, which is in contact with the upper belt 50, of the sheet S conveyed from the drying module 3000 to the fixing module 4000 (see FIG. 1), the image is formed by the ink. Therefore, in the present Embodiment, it is configured that the image formed by the ink can be efficiently fixed to the sheet S by the upper heaters 110, 120 and 130 directly heating the upper belt 50 and applying heat to the sheet S.

The fixing nip portion N is formed between the stretching rollers 61 and 62. The stretching roller 61 is disposed opposite to the stretching roller 80, which is disposed inside a lower belt 70. Similarly, the stretching roller 62 is disposed opposite to the stretching roller 83, which is disposed inside the lower belt 70. It may be a configuration in which the fixing nip portion N is formed or a configuration in which the fixing nip portion N is not formed by the stretching roller 61 and the stretching roller 80. Similarly, it may be a configuration in which the fixing nip portion Nis formed or a configuration the fixing nip portion N is not formed by the stretching roller 62 and the stretching roller 83. It may be any configuration as long as the fixing nip portion N is formed between the stretching rollers 61 and 62.

The stretching roller 62 is a roller with which an area of the upper belt 50 irradiated by the upper heater 130 is in contact first in the conveyance direction of the sheet S. The stretching roller 62 has a role to separate the sheets, and separates the sheets S coming out of the fixing nip portion N by curvature.

The stretching roller 63 is a roller which is disposed downstream of the stretching roller 62 in a rotational direction of the upper belt 50. The stretching roller 63 is a roller which is disposed above the heaters 110, 120 and 130 with respect to a vertical direction so that the heaters 110, 120 and 130 and the inner circumferential surface of the upper belt 50 are not in contact with each other.

The sensor for the upper temperature control 310 as a second temperature sensor is a temperature sensor for detecting a temperature of the upper belt 50 heated by the upper heaters 110, 120 and 130. The sensor for the upper temperature control 310 is disposed on a downstream side of the irradiation area, toward which the infrared rays are irradiated from the upper heater 130, in the rotational direction of the upper belt 50, and, in the present Embodiment, is disposed between the stretching roller 62 and the stretching roller 63.

The sensor for the upper temperature control 310 may have any configuration as long as it is disposed on the downstream side of the irradiation area, toward which the infrared rays are irradiated from the upper heater 130, and on an upstream side of the irradiation area. Here, the irradiation area refers to irradiation areas of the upper heaters 110, 120 and 130, and the sensor for the upper temperature control 310 is disposed in a section from the downstreammost of the irradiation area to the upstreammost of the irradiation area. However, in order to accurately detect a temperature of the sheet coming out of the fixing nip portion N, it is preferable for the sensor for the upper temperature control 310 to be disposed downstream of the fixing nip portion N. In addition, it is more preferable for the sensor for the upper temperature control 310 to be disposed upstream of the stretching roller 63, which is disposed downstream of the fixing nip portion.

In addition, the sensor for the upper temperature control 310 may be a configuration in which the sensor for the upper temperature control 310 is disposed in an area on a downstream side from a center of the fixing nip portion N in the conveyance direction of the sheet, including the disposition of the sensor for the upper temperature control 310 in FIG. 2.

Temperature control of the upper heaters 110, 120 and 130 is performed based on the temperature of the upper belt 50 detected by the sensor for the upper temperature control 310. In a case of the present Embodiment, a high print quality is realized by the upper belt 50 being adjusted so that the temperature thereof downstream of the upper heater 130 becomes a target temperature of about "100° C." based on a detection result of the sensor for the upper temperature control 310. Incidentally, since the target temperature "100° C." is an optimum temperature for the ink to penetrate into the sheet S and a temperature determined according to material of the ink, therefore it is not limited thereto.

The temperature sensors for the upper heaters 210, 220 and 230 as a first temperature sensor (or a third temperature sensor) are temperature sensors of a non-contact type for detecting the temperature of the upper belt 50 for each irradiation area to which infrared ray is irradiated from the upper heaters 110, 120 and 130. The temperature sensors for the upper heaters 210, 220 and 230 are disposed near the upper heaters 110, 120 and 130, respectively. In the present Embodiment, as described below, based on detection results of the temperature sensors for the upper heaters 210, 220 and 230, if the temperature of the irradiation area of the upper belt 50 becomes higher than a threshold value of "150° C.", for example, electric power supply is stopped by energizing of the upper heaters 110, 120 and 130 from an AC power source 900 being cut off, and the upper heaters 110, 120 and 130 become unable to heat the upper belt 50.

<Lower Belt Unit>

The lower belt unit 20 is provided with the lower belt 70 as a second belt, a plurality of stretching rollers 80, 81, 82 and 83 which rotatably stretch the lower belt 70, lower heaters 410 and 420, a sensor for lower temperature control 610 and temperature sensors for lower heaters 510 and 520. In the present Embodiment, the stretching roller 80 is a first stretching roller which stretches the lower belt 70 on an upstream side of the fixing nip portion N in the conveyance direction, and the stretching roller 83 is a second stretching roller which stretches the lower belt 70 on a downstream side of the fixing nip portion N in the conveyance direction. The endless lower belt 70 is in contact with the upper belt 50 to form the fixing nip portion N and is rotated by the rotation of the upper belt 50. The sheet S is nipped and conveyed by the upper belt 50 and the lower belt 70, and the pressure and the heat are applied to the sheet S upon passing through the fixing nip portion N. By this, penetrating performance of the ink, which is applied to the sheet S, into the sheet S is improved, therefore the image is fixed onto the sheet S with high print quality. The lower heaters 410 and 420 are provided inside the stretching rollers 80 and 82, respectively, and indirectly heat the lower belt 70 via the stretching rollers 80 and 82.

The lower heater 410 as a roller heater is provided inside the stretching roller 80 (inside the stretching roller) and heats the stretching roller 80. The lower heater 420 is provided inside the stretching roller 82 and heats the stretching roller 82. The sensor for the lower temperature control 610 as a second roller temperature sensor is a temperature sensor for detecting a temperature of the lower belt 70 heated by the lower heaters 410 and 420. In the present Embodiment, the sensor for the lower temperature control 610 is disposed between the stretching roller 82 and the stretching roller 83 with respect to a rotational direction of the lower belt 70. Temperature control of the lower heaters 410 and 420 is performed based on the temperature of the lower belt 70 detected by the temperature sensor for the lower temperature control 610.

The temperature sensors for the lower heaters 510 and 520 as first roller temperature sensors are temperature sensors for detecting temperature of the surface of the stretching rollers 80 and 82 heated by the lower heaters 410 and 420. In the present Embodiment, as described below, based on the detection results of the temperature sensors for the lower heaters 510 and 520, if the surface temperature of the stretching rollers 80 and 82 becomes higher than a threshold value of "150° C.", for example, heating of the lower belt 70 by the lower heaters 410 and 420 stops by energizing of the lower heaters 410 and 420 from the AC power source 900 being cut off. Incidentally, the threshold value of "150° C.", at which the heating of the lower belt 70 is stopped, is an upper limit temperature, at which the lower belt 70 is not likely to be deformed by heat, and is a temperature determined according to material of the lower belt 70, therefore it is not limited thereto.

Next, the temperature sensors for the upper heaters 210, 220 and 230 will be described using part (a) through part (c) of FIG. 3. Hereinafter, to make the description easier to understand, the temperature sensor for the upper heater 210 is exemplified and described as a representative. Since the temperature sensors for the upper heaters 220 and 230 are the same as the temperature sensor for the upper heater 210, the description thereof will be omitted. Part (a) of FIG. 3 is a view illustrating a configuration of the temperature sensor for the upper heater 210, and a top view is illustrated in an upper row and a side view is illustrated in a lower row. Part (b) of FIG. 3 is a schematic view illustrating a viewing angle 304 of the temperature sensor for the upper heater 210. Part (c) of FIG. 3 is a view for describing on temperature measurement accuracy and the viewing angle 304.

As shown in part (a) of FIG. 3, to the temperature sensor for the upper heater 210, a package 301, inside which a sensor module (not shown) is integrated, is mounted on a substrate 300. The opposite side of the package 301 to the substrate 300 is a detecting surface, and a detecting window 302 capable of passing infrared ray therethrough is formed on the detecting surface. The detecting window 302, as shown in part (b) of FIG. 3, not only allows the infrared ray to pass through into the package 301, but also has a function as a lens. The temperature sensor for the upper heater 210 has a constant viewing angle 304 and detects the temperature of the upper belt 50 by converting energy of the infrared ray, which is emitted from the upper belt 50 of a measurement target 303 and passes through the detecting window 302 in the viewing angle 304, into an electrical signal.

It is assumed that the temperature measurement accuracy is "100%" when the measurement target 303 is on a center line 305 of the viewing angle 304 shown in part (b) of FIG. 3. Then, without changing a distance from the temperature sensor for the upper heater 210, the measurement target 303 is moved left or right from the center line 305. In the present Embodiment, as shown in part (c) of FIG. 3, when the temperature measurement accuracy drops to "50%" due to this movement, an angle θ, which is formed by the measurement target 303 and the center line 305, is defined as the viewing angle 304. Incidentally, the viewing angle 304 is defined as the angle θ when the temperature measurement accuracy drops to "50%" however, this is an example and it is not limited to the temperature measurement accuracy of "50%". The viewing angle 304 may be, for example, the angle θ when the temperature measurement accuracy drops to "40%" or the angle θ when the temperature measurement accuracy drops to "60%".

Next, disposition of the temperature sensor for the upper heater 210 will be described using FIG. 4 through FIG. 6. FIG. 4 is a schematic view illustrating an example in which the temperature sensor for the upper heater 210 is disposed downstream of a reflector 110*a*. The reflector 110*a* reflects and focuses the infrared ray emitted from the upper heater 110 onto the upper belt 50. On the upper belt 50, an irradiation area 9000 corresponding to a shape of the reflector 110*a* is heated by the upper heater 110. Heating intensity 9100 of the irradiation area 9000 has distribution corresponding to the shape of the reflector 110*a*, as shown in a lower row of FIG. 4. The heating intensity 9100 becomes stronger as it comes closer to a center of condensed light 401 by the reflector 110*a* and becomes weaker as it goes away from the center of the condensed light 401.

As shown in FIG. 4, the temperature sensor for the upper heater 210 is disposed on a left side of the reflector 110*a*, that is, disposed downstream of the reflector 110*a* with respect to the conveyance direction of the sheet S (direction of an arrow Z). In addition, the temperature sensor for the upper heater 210 is disposed so that the detecting surface with the detecting window 302 faces an upstream side of the upper belt 50, and in a position out of the irradiation area 9000 of the upper heater 110, in other words, so that the reflector 110*a* does not interfere with the viewing angle 304. It is preferable for the temperature sensor for the upper heater 210 to be disposed so that the center line 305 of the viewing angle 304 faces the center of the condensed light 401 by the reflector 110*a*, i.e., a point where the heating intensity 9100 by the upper heater 110 is strongest on the upper belt 50, however, it is not limited thereto. For example, the temperature sensor for the upper heater 210 may be disposed so that the center line 305 of the viewing angle 304 faces a range from the center of the condensed light 401 where the heating intensity 9100 becomes a maximum value to a place where the heating intensity 9100 becomes 50% of the center of the condensed light 401.

FIG. 5 illustrates an example, compared to FIG. 4, in which the temperature sensor for the upper heater 210 is disposed at a position farther away from the upper belt 50. The temperature sensor for the upper heater 210 is disposed in a position out of the irradiation area 9000 of the upper heater 110, with the center line 305 of the viewing angle 304 facing the center of the condensed light 401 by the reflector 110*a* and the reflector 110*a* not interfering with the viewing angle 304. This point is similar to the case shown in FIG. 4. In FIG. 5, however, the temperature sensor for the upper heater 210 is farther away from the upper belt 50 than in FIG. 4. By this, since it becomes possible to reduce effect of radiation heat from the heated upper belt 50, the temperature sensor for the upper heater 210 can detect the temperature of the upper belt 50 more accurately. Therefore, it is preferable for the temperature sensor for the upper heater 210 to be disposed in a position farther away from the upper belt 50, as long as the viewing angle 304 of the temperature sensor for the upper heater 210 and the reflector 110*a* do not interfere.

FIG. 6 illustrates an example, compared to FIG. 4, in which the temperature sensor for the upper heater 210 is disposed at a position closer to the upper belt 50. Depending on the shape of the reflector 110*a* and the viewing angle 304 of the temperature sensor for the upper heater 210, the temperature sensor for the upper heater 210 needs to be disposed closer to the upper belt 50 than in FIG. 4, as shown in FIG. 6. In this case, as in FIG. 4, the temperature sensor for the upper heater 210 is disposed in a position out of the irradiation area 9000 of the upper heater 110, with the center line 305 of the viewing angle 304 facing the center of the condensed light 401 by the reflector 110*a* and the reflector 110*a* not interfering with the viewing angle 304. However, in the case in which the temperature sensor for the upper heater 210 is disposed closer to the upper belt 50, it is necessary to use the temperature sensor for the upper heater 210 with a higher temperature rating so that a temperature of the temperature sensor for the upper heater 210 does not exceed a rated temperature thereof due to the radiation heat from the heated upper belt 50.

Incidentally, in the disposition of the temperature sensor for the upper heater 210 shown in FIG. 4 and FIG. 5 described above, the viewing angle 304 is within the irradiation area 9000 of the upper heater 110, however, as shown in FIG. 6, the viewing angle 304 may not be within the irradiation area 9000 of the upper heater 110 to some extent. However, in order to accurately detect the temperature of the upper belt 50, it is preferable that the viewing angle 304 be within the irradiation area 9000 of the upper heater 110.

According to the above dispositions of the temperature sensor for the upper heater 210 (220, 230), change in the temperature of the upper belt 50 in the irradiation area 9000 of the upper heater 110 (120, 130) can be detected with high accuracy by using the temperature sensor for the upper heater 210 (220, 230). In addition, since the temperature sensor for the upper heater 210 (220, 230) directly detects the temperature of the upper belt 50, the temperature sensor for the upper heater 210 (220, 230) can detect the change in the temperature of the upper belt 50 in the irradiation area 9000 of the upper heater 110 (120, 130) with good responsiveness.

By the way, depending on a rotation speed of the upper belt 50 and the shape of the reflector 110*a*, the radiation heat from the heated upper belt 50 may generate a hot air flow which flows from upstream to downstream in the conveyance direction of the sheet S with the rotation of the upper belt 50. As described above, in the case in which the temperature sensor for the upper heater 210 is disposed on the downstream side of the reflector 110*a*, the temperature sensor for the upper heater 210 is likely to be exposed to the hot air flow. In particular, if the package 301 is exposed to the hot air flow, the sensor module (not shown) inside the package 301 is affected by the heat, and it becomes difficult to correctly detect the temperature of the upper belt 50.

Therefore, as shown in FIG. 7, the temperature sensor for the upper heater 210 may be disposed on a right side of the reflector 110*a*, i.e., on an upstream side of the reflector 110*a* with respect to the conveyance direction of the sheet S. Also in the case of being disposed on the upstream side, as in the case of being disposed on the downstream side, the temperature sensor for the upstream heater 210 is disposed out of the irradiation area 9000 of the upstream heater 110 with the center line 305 of the viewing angle 304 facing the center of the condensed light 401 by the reflector 110*a* and the viewing angle 304 not interfering with the reflector 110*a*. In this case, the temperature sensor for the upper heater 210 is disposed with the substrate 300 side facing the upstream side, i.e., so that the hot air flow hits the substrate 300 side. Therefore, since the package 301 becomes to be less exposed to the hot air flow and the sensor module inside the package 301 is not affected by the heat, the temperature sensor for the upper heater 210 can correctly detect the temperature of the upper belt 50. In addition, in order for the entire temperature sensor for the upper heater 210 not to be exposed to the hot air flow, the temperature sensor for the upper heater 210 may be held in a holder 6001 as shown in FIG. 8. The holder 6001 is formed in a concave shape, and the temperature sensor for the upper heater 210 is mounted to a mounting portion 6002 so as to be surrounded by the mounting portion 6002 and a shielding portion 6003 of the holder 6001. The holder 6001 is supported by a housing of the upper belt unit 10 (see FIG. 2) with the temperature sensor for the upper heater 210 facing the downstream side. In this case, the hot air flow hits the holder 6001. Thus, since the temperature sensor for the upper heater 210 becomes less exposed to the hot air flow and the sensor module inside the package 301 is not affected by the heat, the temperature sensor for the upper heater 210 can correctly detect the temperature of the upper belt 50. Incidentally, the shielding portion 6003 of the holder 6001 is formed with a height which does not interfere with the viewing angle 304 of the temperature sensor for the upper heater 210.

Part (a) of FIG. 9 is a view illustrating another example of the holder 6001. The holder 6001A shown in part (a) of FIG. 9 has cross section formed in an approximately L-shape, with the shielding portion 6003 protruding from the mounting portion 6002 for mounting the temperature sensor for the upper heater 210 toward the upper belt 50 side to shield the hot air flow. Part (b) of FIG. 9 is a view in which the holder 6001A is viewed from the upstream side of the reflector 110*a*. The holder 6001A is formed about the same width as the upper belt 50 with respect to the widthwise direction crossing the conveyance direction of the sheet S, and a plurality of the temperature sensors for the upper heaters 210 (220, 230) can be mounted on the mounting portion 6002 thereof. Incidentally, the shapes and the sizes of the holders 6001 and 6001A are not limited to thereto, and as long as the shielding portion 6003 is formed between the upper belt 50 to prevent the hot air flow, it is not limited to the shapes and the sizes shown in the figures.

As described above, it becomes possible to suppress for the temperature sensor for the upper heater 210 to be exposed to the hot air flow by having the holder 6001 (6001A) holding the temperature sensor for the upper heater 210. By this, it becomes possible for the temperature sensor for the upper heater 210 to detect the change in the temperature of the upper belt 50 with high accuracy and good responsiveness, since the temperature sensor for the upper heater 210 is configured to directly detect the temperature of the upper belt 50 and the temperature sensor for the upper heater 210 is not affected by the hot air flow.

<Upper Heater Temperature Control System>

Next, a temperature control system which can control the temperature of the upper heaters 110, 120 and 130 in the upper belt unit 10 will be described using FIG. with reference to FIG. 2. The ink jet recording apparatus 1 of the present Embodiment is provided with an upper heater unit 10X which can control the temperature of the upper heaters 110, 120 and 130. As shown in FIG. 10, the upper heater unit 10X includes a CPU (Central Processing Unit) 1100, a relay circuit 1200, FETs (Field Effect Transistors) 111, 121 and 131 as a shutdown portion, and abnormal temperature detecting circuits 211, 221 and 231.

In the present Embodiment, the FET 111 and the abnormal temperature detecting circuit 211, the FET 121 and the abnormal temperature detecting circuit 221, and the FET 131 and the abnormal temperature detecting circuit 231 each constitute a power source circuit (first power source circuit, second power source circuit) for energizing each upper heaters 110, 120 and 130 from the AC power source 900. Incidentally, hereinafter, to make the description easier to understand, a control system for controlling the temperature of the upper heater 110 is exemplified and described representatively. Since control systems for controlling the temperatures of the upper heaters 120 and 130 are the same as the control system for controlling the temperature of the upper heater 110, the description thereof will be omitted.

The CPU 1100 as a control portion is capable of executing temperature control of the upper belt 50 by software control such as PID (Proportional Integral Derivative) control based on the detection result of the sensor for the upper temperature control 310, for example, in order to stabilize the temperature of the upper belt 50. The FET 111 as a voltage adjusting portion is disposed between the AC power source 900 and the upper heater 110 and adjusts voltage provided from the AC power source 900 to the upper heater 110 based on the control by the CPU 1100. That is, the upper heater 110 can perform the heating to the upper belt 50 under the temperature control by the FET 111 being controlled and driven by the CPU 1100.

The temperature sensor for the upper heater 210 detects the temperature of the upper heater 110. The temperature sensor for the upper heater 210 is connected to the abnormal temperature detecting circuit 211 via the FET 111. The abnormal temperature detecting circuit 211 as a switching portion includes, for example, a relay, etc., which operates in response to the temperature of the upper belt 50 detected by the temperature sensor for the upper heater 210. The abnormal temperature detecting circuit 211 can switch the FET 111 between an energization state of energizing the upper heater 110 from the AC power source 900 and a cut off state of cutting off between the AC power source 900 and the upper heater 110. The abnormal temperature detecting circuit 211 switches the FET 111 to the cut off state if the temperature detected by the temperature sensor for the upper heater 210 exceeds a threshold value, irrespective of the control by the CPU 1100.

For example, the abnormal temperature detecting circuit 211 cuts off energizing of the upper heater 110 from the AC power source 900 via the FET 111 by the operation of the relay, for example, if the temperature of the upper heater 110 detected by the temperature sensor for the upper heater 210 exceeds the threshold value (e.g., 150° C.). By this, the upper heater 110 stops the heating of the upper belt 50 irrespective of the control by the CPU 1100. On the other hand, the abnormal temperature detecting circuit 211 starts energizing of the upper heater 110 from the AC power source 900 via the FET 111 by the operation of the relay, for example, if the temperature of the upper heater 110 detected by the temperature sensor for the upper heater 210 becomes the threshold value or lower (150° C. or lower). By this, the upper heater 110 resumes the heating of the upper belt 50 irrespective of the control by the CPU 1100. And if the temperature of the upper heater 110 detected by the temperature sensor for the upper heater 210 is the threshold value or lower, the FET 111 is energized from the AC power source 900, therefore the CPU 1100 can control the upper heater 110. Incidentally, the above threshold value of "150° C." is an upper limit temperature, at which the upper belt 50 is not likely to be deformed by heat, and is a temperature determined according to material of the upper belt 50, therefore it is not limited thereto.

For example, if the detected temperature by the temperature sensor for the upper heater 210 exceeds the threshold value (150° C.), the driving of the FET 111 is stopped by the abnormal temperature detecting circuit 211, however, if the detected temperatures of the other temperature sensors for the upper heaters 220 and 230 do not exceed the threshold value at that time, the driving of the other FETs 121 and 131 is stopped by the CPU 1100. At this time, the CPU 1100 stops the driving of the FETs 121 and 131 according to interrupt signal output from the abnormal temperature detecting circuit 211 when the detected temperature exceeds the threshold value (150° C.). In this manner, the upper heater 110 becomes in a heating-stop state immediately by being switched from ON to OFF by the abnormal temperature detecting circuit 211, and the remaining upper heaters 120 and 130 gradually decrease temperatures thereof, compared to the upper heater 110, under the control of the CPU 1100 and become in the heating-stop state.

For example, if only the temperature sensor for the upper heater 220 exceeds the threshold value, the driving of the FET 121 is stopped by the abnormal temperature detecting circuit 221, and the driving of the other FETs 111 and 131 is stopped by the CPU 1100. If only the temperature sensor for the upper heater 230 exceeds the threshold value, the driving of the FET 131 is stopped by the abnormal temperature detecting circuit 231, and the driving of the other FETs 111 and 121 is stopped by the CPU 1100. If all of the temperature sensors for the upper heaters 210, 220 and 230 exceed the threshold value, the driving of the FETs 111, 121 and 131 is stopped by the abnormal temperature detecting circuits 211, 221 and 231, respectively. As such, if any one of the temperature sensors for the upper heaters 210, 220 or 230 exceeds the threshold value, the heating of the upper belt 50 by all of the upper heaters 110, 120 and 130 is stopped.

<Upper Heater Control Process>

Next, an "upper heater control process" will be described using FIG. 11 with reference to FIG. 2 and FIG. 10. In FIG. 11, a flow chart of the upper heater control process is illustrated. Hereinafter, to make the description easier to understand, the "upper heater control process" for controlling the upper heater 110 is exemplified and described representatively. Since the control for controlling the upper heaters 120 and 130 is the same as the control for controlling the upper heater 110, the description thereof will be omitted.

As shown in FIG. 11, the CPU 1100 controls a driving motor (not shown) of the upper belt 50 to rotate the upper belt 50 and starts the heating of the upper belt 50 by the upper heater 110 (S1). The CPU 1100 changes the temperature of the upper heater 110 based on the detection result of the sensor for the upper temperature control 310 and executes the temperature control of the upper belt 50 (S2). The temperature of the upper belt 50, i.e., the temperature detected by the sensor for the upper temperature control 310, is adjusted to about "100° C.", for example.

The CPU 1100 determines whether or not the temperature of the upper belt 50 is higher than the threshold value of "150° C." in the irradiation area based on the detection result of the temperature sensor for the upper heater 210 (S3). If the temperature of the upper belt 50 is higher than "150° C." in the irradiation area (YES in S3), the CPU 1100 then stops the heating of the upper belt 50 by the upper heaters 120 and 130 other than the upper heater 110 (S4) according to the interrupt signal output from the abnormal temperature detecting circuit 211. At this time, the upper heater 110 is in the heating-stop state by the abnormal temperature detecting circuit 211 since the temperature of the upper belt 50 is higher than "150° C.". Thus, the heating of the upper belt 50 by the upper heaters 110, 120 and 130 is stopped.

On the other hand, if the temperature of the upper belt 50 is "150° C." or lower in the irradiation area (NO in S3), the CPU 1100 determines whether or not the temperature of the upper belt 50 has changed by "+3° C." or more from "100° C.", for example, based on the detection result of the sensor for the upper temperature control 310 (S5). If the temperature of the upper belt 50 has not changed by "+3° C." or more from "100° C." (NO in S5), for example, the CPU 1100 then returns the process to the step S3 described above. In this case, it is considered that the temperature of the upper belt 50 is maintained at "100° C.±3° C.", which is optimal for the ink to penetrate the sheet S, and the temperature of the upper heater 110 will not be changed. In contrast, if the temperature of the upper belt 50 has changed by "±3° C." or more from "100° C." (NO in S5), for example, the CPU 1100 then returns to the process to the step S2 described above. In this case, it is considered that the temperature of the upper belt 50 is not maintained at "100° C.±3° C.", which is optimal for the ink to penetrate the sheet S, and the temperature of the upper heater 110 will be changed.

<Lower Heater Temperature Control System>

Next, a temperature control system which can control temperatures of the lower heaters 410 and 420 in the lower belt unit 20 will be described using FIG. 12 with reference to FIG. 2. The ink jet recording apparatus 1 of the present Embodiment is provided with a lower heater unit 20X which can control the temperatures of the lower heaters 410 and 420. The lower heater unit 20X is provided with a CPU 2100, a relay circuit 2200, FETs 411 and 421, and abnormal temperature detecting circuits 511 and 521, as shown in FIG. 12. To make the description easier to understand, the control system for controlling the temperature of the lower heater 410 is exemplified and described representatively. Since the control system for controlling the temperature of the lower heater 420 is the same as the control system for controlling the temperature of the lower heater 410, the description thereof will be omitted. Incidentally, the CPU 2100 may be common to the CPU 1100 described above.

The FET 411 is controlled and driven by the CPU 2100. By the FET 411 being driven, the lower heater 410 performs heating to the lower belt 70 under temperature control. The CPU 2100 executes the temperature control of the lower belt 70 by software control such as PID control based on detection result of the sensor for the lower temperature control 610 in order to stabilize the temperature of the lower belt 70.

The temperature sensor for the lower heater 510 detects the temperature of the lower heater 410. The temperature sensor for the lower heater 510 is connected to the abnormal temperature detecting circuit 511 via the FET 411. The abnormal temperature detecting circuit 511 includes a relay which operates in response to a surface temperature of the stretching roller 81 detected by the temperature sensor for the lower heater 510. The abnormal temperature detecting circuit 511 cuts off energizing of the lower heater 410 from the AC power source 900 via the FET 411 by the operation of the relay if the surface temperature of the stretching roller 81 detected by the temperature sensor for the lower heater 510 exceeds a threshold value (for example, 150° C.). By this, the lower heater 410 stops the heating of the lower belt 70 irrespective of the control by the CPU 2100. In addition, the abnormal temperature detecting circuit 511 starts energizing of the lower heater 410 from the AC power source

900 via the FET 411 by the operation of the relay if the surface temperature of the stretching roller 81 detected by the temperature sensor for the lower heater 510 becomes the threshold value (150° C.) or lower. By this, the lower heater 410 resumes the heating of the lower belt 70 irrespective of the control by the CPU 2100. Incidentally, the above threshold value of "150° C." is an upper limit temperature at which the lower belt 70 and stretching roller 81 are not likely to be deformed by heat, and is a temperature determined according to material of the lower belt 70 and the stretching roller 81, therefore it is not limited thereto.

For example, if the detected temperature by the temperature sensor for the lower heater 510 exceeds the threshold value (150° C.), the driving of the FET 411 is stopped by the abnormal temperature detecting circuit 511, however, if the detected temperature of the other temperature sensor for the lower heater 520 does not exceed the threshold value, the driving of the FET 421 is stopped by the CPU 2100. At this time, the CPU 2100 stops the driving of the FET 421 according to the interrupt signal output from the abnormal temperature detecting circuit 511 when the detected temperature exceeds the threshold value (150° C.). In this manner, the lower heater 410 becomes in the heating-stop state by being switched from ON to OFF by the abnormal temperature detecting circuit 511, and the lower heater 420 gradually decreases a temperature thereof, compared to the lower heater 410, under the control of the CPU 2100 and becomes in the heating-stop state.

For example, if only the temperature sensor for the lower heater 520 exceeds the threshold value, the driving of the FET 421 is stopped by the abnormal temperature detecting circuit 521, and the driving of the other FET 411 is stopped by the CPU 2100. If both the temperature sensors for the lower heaters 510 and 520 exceed the threshold value, the driving of the FETs 411 and 421 is stopped by the abnormal temperature detecting circuits 511 and 521. As such, if any one of the temperature sensors for the lower heaters 510 and 520 exceeds the threshold value, the heating of the lower belt 70 by all of the lower heaters 410 and 420 via the stretching rollers 81 and 83 is stopped.

<Lower Heater Control Process>

Next, a "lower heater control process" will be described using FIG. 13 with reference to FIG. 2 and FIG. 12. FIG. 13 illustrates a flow chart of the lower heater control process. To make the description easier to understand, the "lower heater control process" for controlling the lower heater 410 is exemplified and described representatively. Since the lower heater 420 is the same as the lower heater 410, the description thereof will be omitted.

As shown in FIG. 13, the CPU 2100 controls a driving motor (not shown) of the lower belt 70 to rotate the lower belt 70 and starts the heating of the lower belt 70 by the lower heater 410 (S21). The CPU 2100 changes the temperature of the lower heater 410 based on the detection result of the sensor for the lower temperature control 610 and executes the temperature control of the lower belt 70 (S22). The temperature of the lower belt 70 is adjusted so that the temperature detected by the sensor for the lower temperature control 610 becomes about "100° C.".

The CPU 2100 determines whether or not the surface temperature of the stretching roller 81 is higher than the threshold value of "150° C." based on the detection result of the temperature sensor for the lower heater 510 (S23). If the surface temperature of the stretching roller 81 is higher than "150° C." (YES in S23), the CPU 2100 then stops the heating of the lower belt 70 by the lower heater 420 according to the interrupt signal output by the abnormal temperature detecting circuit 511 (S24). At this time, the lower heater 410 is in the heating-stop state by the abnormal temperature detecting circuit 511 since the temperature of the lower belt 70 is higher than "150° C.". As such, the heating of the lower belt 70 by the lower heaters 410 and 420 is stopped.

On the other hand, if the surface temperature of the stretching roller 81 is "150° C." or lower (NO in S23), the CPU 2100 then determines whether or not the temperature of the lower belt 70 has changed by "±3° C." or more from "100° C.", for example, based on the detection result of the sensor for the lower temperature control 610 (S25). If the temperature of the lower belt 70 has not changed by "±3° C." or more from "100° C." (NO in S25), for example, the CPU 2100 returns the process to the step S23 described above. In this case, it is considered that the temperature of the lower belt 70 is maintained at "100° C.±3° C.", which is optimal for the ink to penetrate the sheet S, and the temperature of the lower heater 410 will not be changed. In contrast, if the temperature of the lower belt 70 has changed by "±3° C." or more from "100° C." (YES in S25), for example, the CPU 2100 then returns the process to the step S22 described above. In this case, it is considered that the temperature of the lower belt 70 is not maintained at "100° C.±3° C.", which is optimal for the ink to penetrate the sheet S, and the temperature of the lower heater 410 will be changed.

As described above, in the present Embodiment, in the upper belt unit 10, in order to control the temperature of the upper heaters 110, 120 and 130, the sensor for the upper temperature control 310, which detects the temperature of the upper belt 50, is provided. The CPU 1100 executes the PID control, etc. based on the detection result of the sensor for the upper temperature control 310, in order to maintain the temperature of the upper belt 50 at "100° C.±3° C.", which is optimal for the ink to penetrate the sheet S. In addition to the sensor for the upper temperature control 310, the temperature sensors for the upper heaters 210, 220 and 230 of the non-contact type, which detect the temperature of the upper belt 50 for each irradiation area heated by the upper heaters 110, 120 and 130, are provided. The upper heaters 110, 120 and 130 are switched to stop heating and start heating of the upper belt 50 by the abnormal temperature detecting circuits 211, 221 and 231 based on the detection results from the temperature sensors for the upper heaters 210, 220 and 230.

In the temperature control of the upper belt 50 by the CPU 1100 described above, in an abnormal case in which the temperatures of the upper heaters 110, 120 and 130 suddenly increase, it takes time for the detection results of the sensor for the upper temperature control 310 to reflect the abnormality, and it takes time to lower the temperatures of the upper heaters 110, 120 and 130. In light of this, based on the detection results of the temperature sensors for the upper heaters 210, 220 and 230, if the abnormal case occurs in the upper heaters 110, 120 and 130, by the abnormal temperature detecting circuits 211, 221 and 231 stopping the heating of the upper belt 50 forcibly, the temperature of the upper heaters 110, 120 and 130 can be lowered as quickly as possible. By providing two types of sensors in this manner, it becomes possible to adjust a temperature of the sheet S to a predetermined temperature accurately, and if a condition, in which the temperature of the upper belt 50 gets easily risen, arises when an abnormality occurs in the upper heaters 110, 120 and 130, it is possible to suppress the temperature rise of the upper belt 50. In addition, similarly in the lower belt unit 20, by providing the temperature sensors for the lower heaters 510 and 520 in addition to the sensor for the lower temperature control 610, if a condition, in which the temperature of the lower belt 70 gets easily risen, arises when an abnormality occurs in the lower heaters 410 and 420, it is possible to suppress the temperature rise of the lower belt 70.

Embodiment 2

Next, an Embodiment 2 will be described using FIG. 14 through FIG. 16. A fixing module 4000X of the Embodiment 2 differs, with comparing to the fixing module 4000 of the Embodiment 1 described above, in that a rotation detecting sensor 100 and thermoswitches 1110, 1210 and 1310 are provided in the upper belt unit 10, and that a rotation detecting sensor 200 is installed in the lower belt unit 20. Therefore, in FIG. 14 through FIG. 16, the same reference numeral is attached to the same configuration as in the Embodiment 1 to simplify or omit the description, and points, which are different from the Embodiment 1, will mainly be described.

The rotation detecting sensor 100 is a sensor detectable whether or not the upper belt 50 is rotating, and as shown in FIG. 14, in the present Embodiment, the rotation detecting sensor 100 detects a rotation of the stretching roller 60. The thermoswitches 1110, 1210 and 1310 are disposed on a surface of reflectors 110*a*, 120*a* and 130*a*, which cover the upper heaters 110, 120 and 130. The thermoswitches 1110, 1210 and 1310 are electronic components switchable between an energization state of energizing the upper heaters 110, 120 and 130 from the AC power source 900, and an cut off state of cutting off between the AC power source 900 and the upper heaters 110, 120 and 130 in response to changes in temperatures of the reflectors 110*a*, 120*a* and 130*a* by heat. In a case of the present Embodiment, the thermoswitches 1110, 1210 and 1310 are switched from the energization state to the cut off state if the temperature of the reflectors 110*a*, 120*a* and 130*a* rises to a temperature (e.g., 170° C.) or higher, which is higher than a threshold value (e.g., 150° C.). The rotation detecting sensor 200 is a sensor detectable whether or not the lower belt 70 is rotating or not, and in the present Embodiment, the rotation detecting sensor 200 detects a rotation of the stretching roller 81.

As shown in FIG. 15, in the upper belt unit 10, the thermoswitches 1110, 1210 and 1310 electrically connect the AC power source 900 and the upper heaters 110, 120 and 130. In the case of the present Embodiment, for example, if the temperature of the upper heater 110 rises abnormally and reaches the predetermined temperature of "170° C.", the thermoswitch 1110 then cuts off the electric connection between the AC power source 900 and the upper heater 110. By this, the heating of the upper belt 50 by the upper heater 110 is stopped. In addition, if the temperature of the upper heater 110 drops to the predetermined temperature of "170° C." or lower, the thermoswitch 1110 then electrically connects the AC power source 900 and the upper heater 110. By this, the heating of the upper belt 50 by the upper heater 110 is resumed. Incidentally, at this time, if the temperatures of the other upper heaters 120 and 130 do not reach the predetermined temperature of "170° C.", the upper heaters 120 and 130 perform the heating of the upper belt 50 since the electric connection with the AC power source 900 is not cut off by the thermoswitches 1210 and 1310.

The CPU 1100 controls the relay circuit 1200 based on a detection result from the rotation detecting sensor 100. The relay circuit 1200 is a circuit switchable between ON and OFF of energizing the upper heaters 110, 120 and 130 from the AC power source 900. For example, if the rotation detecting sensor 100 detects a stop of the upper belt 50, the CPU 1100 then controls the relay circuit 1200 to stop energizing the upper heaters 110, 120 and 130 from the AC power source 900 at once. By this, the heating of the upper belt 50 by the upper heaters 110, 120 and 130 is stopped. If the rotation detecting sensor 100 detects the rotation of the upper belt 50, the CPU 1100 then controls the relay circuit 1200 to start energizing the upper heaters 110, 120 and 130 from the AC power source 900. By this, the heating of the upper belt 50 by the upper heaters 110, 120 and 130 is resumed.

On the other hand, in the lower belt unit 20, as shown in FIG. 16, the CPU 2100 controls the relay circuit 2200 based on a detection result of the rotation detecting sensor 200. For example, if the rotation detecting sensor 200 detects a stop of the lower belt 70, the CPU 2100 then controls the relay circuit 2200 to stop energizing the lower heaters 410 and 420 from the AC power source 900 at once. By this, the heating of the lower belt 70 by the lower heaters 410 and 420 is stopped. And if the rotation detecting sensor 200 detects a rotation of the lower belt 70, the CPU 2100 then controls the relay circuit 2200 to start energizing the lower heaters 410 and 420 from the AC power source 900. By this, the heating of the lower belt 70 by the lower heaters 410 and 420 is resumed.

Thus, in the present Embodiment, in addition to the switching to stop heating and start heating of the upper belt 50 by the abnormal temperature detecting circuits 211, 221, and 231 described above, the stop heating and the start heating are also switched by the thermoswitches 1110, 1210 and 1310. By this, it becomes possible to suppress the temperature rise of the upper belt 50 even in a case in which a malfunction occurs in any one of the temperature sensors for the upper heaters 210, 220 and 230 or the abnormal temperature detecting circuits 211, 221 and 231. Incidentally, the case in which the thermoswitches 1110, 1210 and 1310 are provided in the upper belt unit 10 is exemplified, however, it is not limited thereto, but the thermoswitches may be provided in the lower belt unit 20 to suppress the temperature rise of the lower belt 70.

Embodiment 3

By the way, when the sheet S is discharged from the fixing nip portion N in the fixing module 4000, if the sheet S is not conveyed correctly, there may be a case in which a winding of the sheet S on the upper belt unit 10 or the lower belt unit 20 occurs at an exit of the fixing nip portion N. In FIG. 17, a case in which the winding of the sheet S on the upper belt unit 10 occurs is illustrated, and in FIG. 18, a case in which the winding of the sheet S on the lower belt unit 20 occurs is illustrated. Incidentally, hereinafter, the same reference numeral will be applied to the same configuration as in the Embodiment 1 described above, and the description thereof will be simplified or omitted.

As shown in FIG. 17, if the sheet S is conveyed correctly, the sheet S is discharged from the fixing nip portion N in a direction of an arrow D2. However, if the sheet S is not conveyed correctly, there may be a case in which the sheet S is not discharged in the direction of the arrow D2, but is conveyed in a direction of an arrow D3, and in such a case, the winding of the sheet S may occur by the stretching roller 62 of the upper belt unit 10. When the sheet S is in a state of the winding, the sheet S may be in a position (a position indicated by S2 in FIG. 17) which interrupts between the sensor for the upper temperature control 310 and the upper belt 50.

If the sensor for the upper temperature control 310 is blocked by the sheet S from the upper belt 50, it is difficult for the sensor for the upper temperature control 310 to correctly detect the temperature of the upper belt 50. Therefore, the temperature of the upper belt 50 may be detected lower than an actual temperature by the sensor for the upper temperature control 310, the upper heater 110, 120 and 130 may be controlled to raise the temperature of the upper belt 50 based on the mis-detected temperature, and as a result, the upper belt 50 may be abnormally heated. In addition, since the temperature of the sheet S rises more slowly than the temperature of the upper belt 50, it is likely to further abnormally heat the upper belt 50 to raise the temperature of the upper belt 50 more.

Alternatively, as shown in FIG. 18, if the sheet S is not conveyed correctly, there may be a case in which the sheet S is not discharged in a direction of an arrow D2, but conveyed in a direction of an arrow D4. In such a case, the winding of the sheet S may occur by the stretching roller 83 of the lower belt unit 20. When the sheet S is in a state of the winding, the sheet S may be in a position (a position indicated by S3 in FIG. 18) which interrupts between the sensor for the lower temperature control 610 and the lower belt 70.

If the sensor for the lower temperature control 610 is blocked by the sheet S from the lower belt 70, it is difficult for the sensor for the lower temperature control 610 to correctly detect the temperature of the lower belt 70. Therefore, the temperature of the lower belt 70 may be detected lower than an actual temperature by the sensor for lower temperature control 610, the lower heater 410 and 420 may be controlled to raise the temperature of the lower belt 70 based on the mis-detected temperature, and as a result, the lower belt 70 may be abnormally heated. In addition, since the temperature of the sheet S rises more slowly than the temperature of the lower belt 70, it is likely to further abnormally heat the lower belt 70 to raise the temperature of the lower belt 70 more.

Thus, the fixing module 4000 of an Embodiment 3, in which the upper belt 50 and the lower belt 70 are made difficult to be heated abnormally even if the winding of the sheet S occurs as described above, will be described using FIG. 19. As shown in FIG. 19, in the upper belt unit 10, the sensor for the upper temperature control 310 is disposed inside the upper belt 50 and between the stretching roller 61 and the stretching roller 62 so as to be detectable of the temperature of the upper belt 50. In the lower belt unit 20, the sensor for the lower temperature control 610 is disposed inside the lower belt 70 and between the stretching roller 83 and the stretching roller 80 so as to be detectable of the temperature of the lower belt 70. In this manner, even if the winding of the sheet S occurs, since the sensor for the upper temperature control 310 is not blocked by the sheet S from the upper belt 50, the sensor for the upper temperature control 310 can correctly detect the temperature of the upper belt 50. Since the same applies to the lower belt unit 20, the description will be omitted here.

As described above, high print quality is realized, in the upper belt 50, when the temperature downstream of the upper heaters 110, 120 and 130 is about "100° C.". Therefore, the sensor for the upper temperature control 310 should be disposed in a position close to the downstreammost upper heater 130. However, as shown in FIG. 19, in the lower belt unit 20, a supporting member 700 which supports the lower belt 70 is disposed between the stretching roller 80 and the stretching roller 83 in the conveyance direction of the sheet S (a direction of an arrow Z). The supporting member 700 supports the lower belt 70 from an inner circumferential side so as the lower belt 70 to be capable of pressing toward the upper belt 50 side to maintain nipping pressure in the fixing nip portion N formed by the upper belt 50 and the lower belt 70. The supporting member 700 is formed of stainless steel sheet metal, etc., and a length thereof in the conveyance direction is set to "900 mm", for example. Since the supporting member 700 has a large thermal capacity, if the sensor for the upper temperature control 310 is disposed in a position overlapping the supporting member 700 when viewed from a direction crossing the conveyance direction of the sheet S (vertical direction in FIG. 19), it is difficult for the sensor for the upper temperature control 310 to detect the temperature of the upper belt 50 with good responsiveness. Therefore, in the present Embodiment, it is preferable for the sensor for the upper temperature control 310 to be disposed between a downstream end of the supporting member 700 and the stretching roller 62 with respect to the conveyance direction of the sheet S so as not to overlap the supporting member 700 when viewed from the direction crossing the conveyance direction of the sheet S. Similarly, in the lower belt unit 20, it is preferable for the sensor for the lower temperature control 610 to be disposed between the downstream end of the supporting member 700 and the stretching roller 83 with respect to the conveyance direction of the sheet S so as not to overlap the supporting member 700 when viewed from the direction crossing the conveyance direction of the sheet S. Thus, the sensor for the upper temperature control 310 and the sensor for the lower temperature control 610 detect the temperatures of the upper belt 50 and the lower belt 70, respectively, upstream of the stretching roller 62 and the stretching roller 83 and downstream of the downstream end of the supporting member 700 with respect to the conveyance direction.

As described above, according to the present Embodiment, the temperatures of the upper belt 50 and the lower belt 70 can be properly detected by the sensor for the upper temperature control 310 and the sensor for the lower temperature control 610, even in the case in which the winding of the sheet S occurs. Therefore, even if the winding of the sheet S occurs, the temperatures of the upper belt 50 and the lower belt 70 are unlikely to be higher than the optimal temperature for the ink to penetrate the sheet S.

OTHER EMBODIMENTS

By the way, in order to improve the fixing performance by drying the ink sufficiently in the ink jet recording apparatus 1, it is necessary to raise the ink to a predetermined temperature or higher in the fixing nip portion N formed by the upper belt 50 and the lower belt 70 to volatilize a solvent and the liquid content contained in the ink. In order to "raise the temperature of the ink in the fixing nip portion N to the predetermined temperature or higher", in the present Embodiment, the upper belt 50 is put under a temperature control to a target temperature based on the detection result of the sensor for the upper temperature control 310, and the lower belt 70 is put under a temperature control to the target temperature based on the detection result of the sensor for the lower temperature control 610.

The above target temperature is set to the optimum temperature determined according to the material of the ink. In order to dry the ink on sheet S sufficiently, for example, the ink must be heated to a predetermined temperature of "71° C." or higher. Therefore, as described above, in the present Embodiment, by the upper belt 50 being put under the temperature controlled to the target temperature of "100°

C.", it is configured that the ink on the sheet S is heated to "71° C." or higher in the fixing nip portion N. In addition, the lower belt 70 is put under the temperature control to the target temperature of "100° C." in the same way as the upper belt 50.

However, in order to dry the ink sufficiently, in addition to "raising the temperature of the ink to the predetermined temperature or higher in the fixing nip portion N" as described above, it is necessary to "ensure drying time sufficiently in the fixing nip portion N while maintaining the raised temperature of the ink". That is, even if the ink can be heated to "71° C." or higher in the fixing nip portion N, if the state lasts for less than "0.9 seconds", for example, the ink will not dry sufficiently, making it difficult to realize the high print quality. In order to ensure the drying time for the ink to dry sufficiently, arranging positions of the upper heaters 110, 120 and 130 come to be important. Details will be described below.

Next, a length of the fixing nip portion N in the conveyance direction will be described. In the present Embodiment, a conveying speed of the sheet S is set to "700 mm/sec", for example. In this case, in order to ensure the drying time (e.g., 0.9 seconds or longer) for the ink to dry sufficiently, the length of the fixing nip portion N must be at least "630 mm (0.9 sec×700 mm/sec)" or longer with respect to the conveyance direction of the sheet S. However, when the length of the fixing nip portion N is made longer than necessary, adverse effects such as larger diameter of the upper belt 50 and the lower belt 70 and lower thermal efficiency due to an increase of heat dissipation area occur, therefore the length of the fixing nip portion N is set to "900 mm" in the present Embodiment.

<Arranging Positions of the Upper Heaters>

Next, the arranging positions of the upper heaters 110, 120 and 130 in the present Embodiment will be described using FIG. 20 through FIG. 25. FIG. 20 is a schematic view describing the arranging position of the upper heater of the present Embodiment. FIG. 21 is a schematic view describing the arranging position of the upper heater of a Comparative Example 1. FIG. 22 is a schematic view describing the arranging position of the upper heater of a Comparative Example 2. FIG. 23 is a schematic view describing the arranging position of the upper heater of a Comparative Example 3. However, to make the description easier to understand, in FIG. 20 through FIG. 23, a case in which only one upper heater 110 is used is exemplified. Incidentally, hereinafter, the same reference numeral will be applied to the same configuration as in the Embodiment 1 described above, and the description thereof will be simplified or omitted.

As shown in FIG. 20, in the present Embodiment, with respect to the conveyance direction of the sheet S (a direction of an arrow Z), a distance (L1) from an exit of the fixing nip portion N to a center of an irradiation area H of the upper heater 110 is "675 mm", and the upper heater 110 is arranged so that ratio to a length of the fixing nip portion N L2 (900 mm) "L1/L2" becomes "0.75".

In the Comparative Example 1 shown in FIG. 21, the upper heater 110 is arranged more downstream side in the conveyance direction than the present Embodiment in the fixing nip portion N. The Comparative Example 1 is an example in which a heater position L1 is "270 mm" and the upper heater 110 is arranged so that "L1/L2" becomes "0.30".

In the Comparative Example 2 shown in FIG. 22, the upper heater 110 is arranged in about the center of the fixing nip portion N, which is an upstream side in the conveyance direction compared to the Comparative Example 1. The Comparative Example 2 is an example in which the heater position L1 is "450 mm" and the upper heater 40 is arranged so that "L1/L2" becomes "0.50". In the Comparative Example 3 shown in FIG. 23, the upper heater 110 is arranged near an entrance of the fixing nip portion N. The Comparative Example 3 is an example in which the heater position L1 is "873 mm" and the upper heater 40 is arranged so that "L1/L2" becomes "0.97".

In FIG. 24, transition of a surface temperature of the sheet S passing through the fixing nip portion N from the entrance to the exit for each heater arrangement of the present Embodiment and the Comparative Examples 1 through 3 described above. In FIG. 24, a horizontal axis represents a position of the sheet S passing through the fixing nip portion N, and a vertical axis represents the surface temperature of the sheet S. Incidentally, the surface temperature of the sheet S corresponds approximately to the temperature of the ink on the sheet S.

As shown in FIG. 24, the surface temperature of sheet S is "40° C." at the entrance of the fixing nip portion N. As the sheet S contacts the upper belt 50 while passing through the fixing nip portion N, the surface temperature of the sheet S rises to about "90° C." at the exit of the fixing nip portion N. Since the only difference between the present Embodiment and the Comparative Examples 1 through 3 is the arranging position of the upper heater 110, the surface temperatures of the sheet S at the exit of the fixing nip portion N are the same. However, when comparing the temperature transition of the sheet S while passing through the fixing nip portion N, the surface temperature of the sheet S rises sharply when the sheet S passes through the irradiation area H, which is heated by the upper heater 110.

As described above, to dry the ink, it is necessary to heat the surface temperature of the sheet S to "71° C." or higher and maintain the temperature of the ink at "71° C." or higher for "0.9 sec" or longer. In the Comparative Examples 1 and 2, in which "L1/L2" is smaller than in the present Embodiment, the time maintained at "71° C." or higher is less than "0.9 sec". As a result, the drying of the ink is insufficient, and it is difficult to realize the high print quality. Therefore, in order to improve the fixing performance of the ink, it is preferable that the upper heater 110 be arranged on the upstream side in the conveyance direction than in the Comparative Examples 1 and 2. That is, the larger "L1/L2", the better the fixing performance of the ink.

In the case of the Comparative Example 3 shown in FIG. 23, "L1/L2" is "0.97", therefore the fixing performance of the ink can be improved more than the Comparative Examples 1 and 2. However, in the case of the Comparative Example 3, as shown in FIG. 24, because the temperature of the sheet S is likely to rise sharply at the entrance of the fixing nip portion N, it is likely that unevenness in the volatilization of the liquid content contained in the sheet S and the ink occurs, and therefore there is a possibility to make deformation occur in the sheet S, in particular, when the sheet S is a thin paper.

In Table 1, results of "image fixing performance" and "sheet deformation" for the present Embodiment and the Comparative Examples 1 through 3 are shown. In order to realize both prevention of the "sheet deformation" and improvement of the "image fixing performance", it is necessary to arrange the upper heater 110 so that "the heater position L1/the length of the fixing nip portion N L2" is in a predetermined range. It is preferable for the upper heater 110 to be arranged so that "L1/L2" is "0.70 or more and 0.95 or less", for example.

TABLE 1

| | Nip length L2 | Heater position L1 | L1/L2 | Ink drying time | Image fixing performance | Sheet deformation |
|---|---|---|---|---|---|---|
| Present Embodiment | 900 mm | 675 mm | 0.75 | 0.93 sec | ○ | ○ |
| Comparative Example 1 | 900 mm | 270 mm | 0.30 | 0.74 sec | x | ○ |
| Comparative Example 2 | 900 mm | 450 mm | 0.50 | 0.74 sec | x | ○ |
| Comparative Example 3 | 900 mm | 873 mm | 0.97 | 1.03 sec | ○ | x |

Incidentally, even in the cases of the Comparative Examples 1 and 2, there are ways to improve the fixing performance of the ink. For example, if the length L2 of the fixing nip portion N is made to be larger than "900 mm", it becomes possible to ensure the drying time, therefore it may be possible to improve the fixing performance of the ink. However, if the length of the fixing nip portion N is increased, an overall size of the fixing module 4000 gets larger, therefore it is difficult to employ. Alternatively, if the target temperature is set higher temperature than "100° C.", it becomes possible to raise the temperature of the ink to "71° C." or higher in a shorter time than in the case of "100° C.", therefore it may be possible to improve the fixing performance of the ink. However, as described in the Comparative Example 3, because the temperature of the sheet S rises sharply at the entrance of the fixing nip portion N, and there is a possibility to make the deformation occur in the sheet, therefore it is difficult to employ. Because of these reasons as well, it is preferable that the upper heater 110 be disposed so that "L1/L2" is "0.70 or more and 0.95 or less".

Incidentally, in FIG. 20 described above, the case in which only one upper heater 110 is used is exemplified, however, as in the Embodiment 1 through the Embodiment 3 described above, the upper heater 110 may be provided more than one. When heating the upper belt 50 using a plurality of the upper heaters 110, 120 and 130, an optimal heating of the upper belt 50 corresponding to a length of the sheet S in the conveyance direction becomes possible, compared to the case of using only one upper heater 110. FIG. 25 is a schematic view for describing arranging positions of the plurality of the upper heaters. FIG. 26 is a schematic view for describing irradiation areas by the plurality of the upper heaters.

As shown in FIG. 25, the infrared rays emitted from the upper heaters 130, 120 and 110 are reflected by the reflectors 130*a*, 120*a* and 110*a* to heat irradiation areas Ha, Hb and Hc of the inner circumferential surface of the upper belt 50 directly below each heater. Distances from the exit of the fixing nip portion N to each center of the irradiation area Ha, Hb and Hc with respect to the conveyance direction of the sheet S are "645 mm", "675 mm" and "705 mm", respectively. Incidentally, the length of the fixing nip portion N L2 is "900 mm".

In Table 2, relationship with irradiation area position L3 corresponding to combination of heating (ON) and non-heating (OFF) of the upper heaters 130, 120 and 110 is shown. The irradiation area position L3 is a distance from the exit of the fixing nip portion N to a center of all irradiation area heated by the heating upper heaters 130, 120 and 110. For example, in a case in which the upper heaters 130 and 120 are heated and the upper heater 110 is not heated, as shown in FIG. 26, the all irradiation area is an area "H", which is combining the irradiation area Ha and Hb, and the irradiation area position L3 is "660 mm".

TABLE 2

| Upper heater | | | Irradiation area | |
|---|---|---|---|---|
| 130 | 120 | 110 | position L3 | L3/L2 |
| ON | OFF | OFF | 645 mm | 0.72 |
| OFF | ON | OFF | 675 mm | 0.75 |
| OFF | OFF | ON | 705 mm | 0.78 |
| ON | ON | OFF | 660 mm | 0.73 |
| ON | OFF | ON | 675 mm | 0.75 |
| OFF | ON | ON | 690 mm | 0.77 |
| ON | ON | ON | 675 mm | 0.75 |

As shown in Table 2, even in the case in which the plurality of the upper heaters 110, 120, 130 are combined to generate heat, the plurality of the upper heaters 110, 120 and 130 are arranged so that "the irradiation area position L3/the length of the fixing nip portion N L2" is "0.70 or more and 0.95 or less". By this, even in the case in which the plurality of the upper heaters 110, 120 and 130 are combined to generate the heat corresponding to the length of sheet S in the conveyance direction, it becomes possible to realize both the prevention of the "sheet deformation" and the improvement of the "image fixing performance" as in the case in which only one upper heater 110 is used as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2023-048257, filed on Mar. 24, 2023 and 2023-211539, filed on Dec. 14, 2023, which are hereby incorporated by reference herein in its entirety.

What is claimed is:

1. An ink jet recording apparatus comprising:

an image forming portion configured to form an image on a sheet by discharging ink;

an endless first belt stretched by a plurality of rollers;

a second belt in contact with the first belt and configured to form a nip portion;

a heater disposed inside the first belt and configured to heat the nip portion in a non-contact manner, wherein the first belt and the second belt nip and convey, and pressurize and heat the sheet which bears the image formed by the image forming portion;

a first roller which is one of the plurality of rollers disposed upstreammost among the plurality of rollers in a conveyance direction of the sheet;

a second roller which is another of the plurality of rollers disposed downstream of an irradiation area which is an area, of the first belt, heated by the heater in the conveyance direction of the sheet and configured to separate the sheet;

a first temperature detecting member configured to detect a temperature of the irradiation area in an inner circumferential surface;

a third roller which is another of the plurality of rollers disposed between from the second roller to the first roller in a rotational direction of the first belt; and a second temperature detecting member configured to detect a temperature of the first belt between from the second roller to the third roller in the rotational direction of the first belt.

2. An ink jet recording apparatus according to claim 1, wherein the first temperature detecting member detects the temperature of the irradiation area in the non-contact manner.

3. An ink jet recording apparatus according to claim 2, further comprising a reflector configured to reflect radiation heat of the heater toward the nip portion.

4. An ink jet recording apparatus according to claim 3, wherein the first temperature detecting member is disposed outside of the reflector in the conveyance direction of the sheet.

5. An ink jet recording apparatus according to claim 3, further comprising:

a control portion configured to control the heater based on the temperature detected by the second temperature detecting member so that the temperature of the first belt becomes a predetermined target temperature; and a power source circuit configured to energize the heater, wherein in a case in which the temperature detected by the first temperature detecting member is a threshold value or lower, the control portion controls the heater by energizing of the power source, and wherein in a case in which the temperature detected by the first temperature detecting member exceeds the threshold value, the control portion cuts off energizing of the power source irrespective of control of the heater by the control portion.

6. An ink jet recording apparatus according to claim 5, wherein the heater is a first belt heater, and further comprising:

a second belt heater disposed in an inner circumferential side of the first belt and in line with the first belt heater with respect to the conveyance direction of the sheet, and configured to heat the nip portion in the non-contact manner;

a second reflector configured to reflect radiation heat of the second belt heater toward the nip portion of the first belt;

a third temperature detecting member disposed in the inner circumferential side of the first belt in the non-contact manner and configured to detect a temperature of a second irradiation area where the second belt heater heats the first belt; and a second power source circuit configured to energize the second belt heater, wherein in a case in which the temperature detected by the third temperature detecting member is the threshold value or lower, the control portion controls the second belt heater by energizing of the second power source, and wherein in a case in which the temperature detected by the third temperature detecting member exceeds the threshold value, the control portion cuts off energizing of the second power source irrespective of control of the second belt heater by the control portion.

7. An ink jet recording apparatus according to claim 5, further comprising a thermoswitch disposed outside the reflector and switchable between an energization state of energizing the heater and a cut off state of cutting off between the power source and the heater in response to a temperature of the reflector, wherein the thermoswitch switches from the energization state to the cut off state in a case in which the temperature of the reflector is higher than the threshold value.

8. An ink jet recording apparatus according to claim 5, further comprising:

a rotation detecting sensor configured to detect rotation of the first belt; and a relay circuit switchable between on and off of energizing the heater, wherein in a case in which the rotation of the first belt is not detected by the rotation detecting sensor, the control portion causes the relay circuit to switch from on to off of energizing the heater irrespective of the temperature detected by the second temperature detecting member.

9. An ink jet recording apparatus according to claim 3, wherein the first temperature detecting member is disposed upstream of the reflector with respect to the conveyance direction of the sheet.

10. An ink jet recording apparatus according to claim 9, further comprising a shielding portion disposed so as to cover an upstream side of the first temperature detecting member with respect to the conveyance direction of the sheet and configured to shield a hot air flow flowing from upstream toward downstream in the conveyance direction with rotation of the first belt.

11. An ink jet recording apparatus according to claim 10, further comprising a holder configured to hold the first temperature detecting member, wherein the shielding portion is formed on the holder.

12. An ink jet recording apparatus according to claim 3, wherein the first temperature detecting member includes a detecting window capable of passing infrared ray therethrough, wherein the detecting window is disposed toward a place which is a place from where heating intensity of the heater becomes a maximum value to a place where the heating intensity becomes 50% of the maximum value in the irradiation area.

13. An ink jet recording apparatus according to claim 12, wherein the detecting window of the first temperature detecting member is disposed toward the place where the heating intensity of the heater becomes the maximum value in the irradiation area.

14. An ink jet recording apparatus according to claim 1, wherein the second temperature detecting member detects the temperature of an outer surface of the first belt.

15. An ink jet recording apparatus according to claim 1, further comprising:

a fourth roller configured to stretch the second belt upstream of the nip portion in the conveyance direction of the sheet;

a fifth roller configured to stretch the second belt downstream of the nip portion in the conveyance direction of the sheet; and a supporting member disposed between the fourth roller and the fifth roller in the conveyance direction of the sheet and configured to support the second belt so as to press against the first belt to form the nip portion.

16. An ink jet recording apparatus according to claim 1, wherein the second roller is disposed downstreammost among the plurality of rollers in the conveyance direction of the sheet.

17. An ink jet recording apparatus according to claim 1, wherein the second roller is a roller with which a predetermined area of the first belt is in contact first in the rotational direction of the first belt after heated by the heater.

18. An ink jet recording apparatus according to claim 1, wherein the third roller is disposed above the heater with respect to a vertical direction.

19. An ink jet recording apparatus comprising:

an image forming portion configured to form an image on a sheet by discharging ink;

an endless first belt stretched by a plurality of rollers;

a second belt in contact with the first belt and configured to form a nip portion;

a heater disposed inside the first belt and configured to heat the nip portion in a non-contact manner, wherein the first belt and the second belt nip and convey, and pressurize and heat the sheet which bears the image formed by the image forming portion;

a first roller which is one of the plurality of rollers disposed upstreammost among the plurality of rollers in a conveyance direction of the sheet;

a second roller which is another of the plurality of rollers disposed downstream of an irradiation area which is an area, of the first belt, heated by the heater in the conveyance direction of the sheet and configured to separate the sheet;

a first temperature detecting member configured to detect a temperature of the irradiation area in an inner circumferential surface; and a second temperature detecting member configured to detect a temperature of the first belt between from a downstream end of the irradiation area to an upstream ed of the irradiation area.

20. An ink jet recording apparatus according to claim 19, further comprising a third roller disposed between from the second roller to the first roller in a rotational direction of the first belt and configured to stretch the first belt, wherein the second temperature detecting member detects the temperature of the first belt between from the irradiation area to the third roller in the rotational direction of the first belt.

* * * * *